(12) United States Patent
Sha et al.

(10) Patent No.: US 12,052,066 B2
(45) Date of Patent: Jul. 30, 2024

(54) ELECTRONIC DEVICE, WIRELESS COMMUNICATION METHOD AND COMPUTER-READABLE STORAGE MEDIUM

(71) Applicant: Sony Group Corporation, Tokyo (JP)

(72) Inventors: Ziyuan Sha, Beijing (CN); Zhaocheng Wang, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 297 days.

(21) Appl. No.: 17/636,028

(22) PCT Filed: Sep. 4, 2020

(86) PCT No.: PCT/CN2020/113354
§ 371 (c)(1),
(2) Date: Feb. 17, 2022

(87) PCT Pub. No.: WO2021/047444
PCT Pub. Date: Mar. 18, 2021

(65) Prior Publication Data
US 2022/0286214 A1    Sep. 8, 2022

(30) Foreign Application Priority Data
Sep. 11, 2019   (CN) .......................... 201910859932.4

(51) Int. Cl.
*H04B 17/336* (2015.01)
*H04B 7/06* (2006.01)
*H04B 7/08* (2006.01)

(52) U.S. Cl.
CPC .......... *H04B 17/336* (2015.01); *H04B 7/088* (2013.01)

(58) Field of Classification Search
CPC ..... H04B 17/336; H04B 7/088; H04B 7/0695
See application file for complete search history.

(56) References Cited

U.S. PATENT DOCUMENTS

| 2015/0236774 | A1  | 8/2015 | Son et al. |
| 2017/0244435 | A1* | 8/2017 | Yamada .................. H04B 1/10 |
| (Continued) |

FOREIGN PATENT DOCUMENTS

| CN | 108039903 A | 5/2018 |
| CN | 109565400 A | 4/2019 |
| (Continued) |

OTHER PUBLICATIONS

NTT DOCOMO et al: "Discussion on multi-beam enhancement", 3GPP Draft; RI-1909202, 3rd Generation Partnership Project (3GPP), Mobile Competence Centre ; 650, Route Des Lucioles ; F-06921 Sophia-Antipolis Cedex ; France vol. RAN WGI, no. Prague. CZ; Aug. 26, 2019-Aug. 30, 2019 Aug. 2019 (Aug. 17, 2019), XP051765807, Retrieved from the Internet: URL: http://www.3gpp.org/ftp/tsg_ran/WG1_RL 1/TSGR1_98/Docs/RI-1909202.zip [retrieved on Aug. 17, 2019].

(Continued)

*Primary Examiner* — Harry H Kim
(74) *Attorney, Agent, or Firm* — XSENSUS LLP

(57) ABSTRACT

An electronic device includes a processing circuit configured to execute a beam measurement process, so as to determine, under each pre-set interference scene, the channel quality between each receiving beam of the electronic device and each transmitting beam of a network side device serving the electronic device, and determine a receiving beam according to the channel quality under each pre-set interference scene, the transmitting beam of the network side device and a pre-set interference scene in which the electronic device is located, such that a signal-to-interference-and-noise ratio obtained when the electronic device uses the (Continued)

determined receiving beam to receive a signal is the maximum, the pre-set interference scene representing an interference situation of the network side device around the electronic device to the electronic device.

12 Claims, 12 Drawing Sheets

(56) References Cited

U.S. PATENT DOCUMENTS

| | | | |
|---|---|---|---|
| 2018/0097548 A1* | 4/2018 | Kim | H04B 7/0478 |
| 2018/0227106 A1* | 8/2018 | Kim | H04L 5/0048 |
| 2020/0220665 A1* | 7/2020 | Sun | H04W 72/20 |
| 2021/0092001 A1* | 3/2021 | Yoshioka | H04B 7/088 |
| 2021/0250913 A1* | 8/2021 | Ganesan | H04W 76/14 |
| 2021/0258940 A1* | 8/2021 | Kim | H04L 5/0023 |
| 2022/0256382 A1* | 8/2022 | Kang | H04B 17/336 |
| 2022/0264348 A1* | 8/2022 | Manolakos | H04L 5/0073 |
| 2022/0286214 A1* | 9/2022 | Sha | H04B 7/088 |
| 2023/0179279 A1* | 6/2023 | Huang | H04B 7/088 370/252 |

FOREIGN PATENT DOCUMENTS

| | | |
|---|---|---|
| WO | 2018/177246 A1 | 10/2018 |
| WO | WO-2019081047 A1 | 5/2019 |
| WO | WO-2020165494 A1 | 8/2020 |

OTHER PUBLICATIONS

International Search Report and Written Opinion dated Dec. 9, 2020, received for PCT Application PCT/CN2020/113354, Filed on Sep. 4, 2020, 8 pages including English Translation.

Sony, "Enhancements on Multi-Beam Operation", 3GPP TSG RAN WG1 #96bis, R1-1904241, Apr. 8-12, 2019, 9 pages.

* cited by examiner

ELECTRONIC DEVICE, WIRELESS COMMUNICATION METHOD AND COMPUTER-READABLE STORAGE MEDIUM

CROSS-REFERENCE TO RELATED APPLICATIONS

The present application is based on PCT/CN2020/113354 filed on Sep. 4, 2020, which claims priority to Chinese Patent Application No. 201910859932.4, titled "ELECTRONIC DEVICE, WIRELESS COMMUNICATION METHOD AND COMPUTER-READABLE STORAGE MEDIUM", filed on Sep. 11, 2019 with the China National Intellectual Property Administration, each of which is incorporated herein by reference in its entirety.

FIELD

Embodiments of the present disclosure generally relate to the field of wireless communications, and in particular to electronic equipment, a wireless communication method, and a computer-readable storage medium. More specifically, the present disclosure relates to electronic equipment serving as network side equipment in a wireless communication system, electronic equipment serving as user equipment in a wireless communication system, a wireless communication method performed by network side equipment in a wireless communication system, a wireless communication method performed by user equipment in a wireless communication system, and a computer-readable storage medium.

BACKGROUND

Beamforming is a signal preprocessing technology based on an antenna array. In beamforming, a directional beam is generated by adjusting a weighting coefficient of each element in the antenna array, so that a significant array gain is obtained. Therefore, beamforming has great advantages in terms of expanding coverage, improving edge throughput, and interference suppression.

In downlink transmission, network side equipment selects a transmitting beam from multiple transmitting beams to transmit downlink information. When being provided with multiple receiving beams, user equipment selects a suitable receiving beam to receive the downlink information transmitted by the network side equipment, so as to obtain a beamforming gain. In the existing receiving beam selection solution, the user equipment selects the receiving beam based on RSRP (Reference Signal Receiving Power) of a cell. That is, the user equipment selects a receiving beam with the largest received power to receive the downlink information. Since interference between cells is not considered, the user equipment may experience interference from a neighboring cell when receiving the downlink information, resulting in a decrease in communication performance. The interference between cells can be eliminated through silence. That is, when a transmitting beam of a cell interferes with user equipment of a neighboring cell, network side equipment that transmits the interference signal or the interfered user equipment is silent for a short period of time, thereby reducing interference. However, this method may result in a waste of resources.

Therefore, it is required to propose a technical solution to enable the user equipment to select a receiving beam more reasonably, thereby reducing interference between cells.

SUMMARY

This part provides a general summary of the present disclosure, rather than a comprehensive disclosure of full scope or all features of the present disclosure.

The present disclosure aims to provide electronic equipment, a wireless communication method, and a computer-readable storage medium, so that user equipment selects a receiving beam more reasonably, thereby reducing interference between cells.

According to an aspect of the present disclosure, electronic equipment is provided. The electronic equipment includes processing circuitry. The processing circuitry is configured to: perform a beam measurement process, to determine channel quality between each receiving beam of the electronic equipment and each transmitting beam of network side equipment serving the electronic equipment under each preset interference scenario; and determine a receiving beam according to channel quality under each preset interference scenario, a transmitting beam of the network side equipment and a preset interference scenario where the electronic equipment is located, such that a signal to interference plus noise ratio obtained when the electronic equipment receives a signal using the determined receiving beam is the largest. The preset interference scenario represents interference conditions of network side equipment around the electronic equipment to the electronic equipment.

According to another aspect of the present disclosure, electronic equipment serving as network-side equipment is provided. The electronic equipment includes processing circuitry. The processor is configured to: set, for user equipment, an NZP CSI-RS (Non-Zero-Power Channel State Information-Reference Signal) resource set and a ZP CSI-RS (Zero-Power Channel State Information-Reference Signal) resource set, to be used for the user equipment to perform a beam measurement process, such that the user equipment determines channel quality between each receiving beam of the user equipment and each transmitting beam of the electronic equipment under each preset interference scenario; and transmit, to the user equipment, a transmitting beam of the electronic equipment and a preset interference scenario where the user equipment is located, to be used for the user equipment to determine a receiving beam according to channel quality under each preset interference scenario, the transmitting beam of the electronic equipment and the preset interference scenario where the user equipment is located, such that a signal to interference plus noise ratio obtained when the user equipment receives a signal using the determined receiving beam is the largest. The preset interference scenario represents interference conditions of other network side equipment neighboring the electronic equipment to the user equipment.

According to another aspect of the present disclosure, a wireless communication method performed by electronic equipment is provided. The method includes, performing a beam measurement process, to determine channel quality between each receiving beam of the electronic equipment and each transmitting beam of network side equipment serving the electronic equipment under each preset interference scenario; and determining a receiving beam according to channel quality under each preset interference scenario, a transmitting beam of the network side equipment and a preset interference scenario where the electronic equipment is located, such that a signal to interference plus noise ratio obtained when the electronic equipment receives a signal using the determined receiving beam is the largest. The preset interference scenario represents interference conditions of network side equipment around the electronic equipment to the electronic equipment.

According to another aspect of the present disclosure, a wireless communication method performed by electronic equipment serving as network side equipment is provided. The method includes: setting, for user equipment, an NZP CSI-RS resource set and a ZP CSI-RS resource set, to be used for the user equipment to perform a beam measurement process, such that the user equipment determines channel quality between each receiving beam of the user equipment and each transmitting beam of the electronic equipment under each preset interference scenario; and transmitting, to the user equipment, a transmitting beam of the electronic equipment and a preset interference scenario where the user equipment is located, to be used for the user equipment to determine a receiving beam according to channel quality under each preset interference scenario, the transmitting beam of the electronic equipment and the preset interference scenario where the user equipment is located, such that a signal to interference plus noise ratio obtained when the user equipment receives a signal using the determined receiving beam is the largest. The preset interference scenario represents interference conditions of other network side equipment neighboring the electronic equipment to the user equipment.

According to another aspect of the present disclosure, a computer-readable storage medium is provided. The computer-readable storage medium includes executable computer instructions that, when executed by a computer, cause the computer to execute the wireless communication method according to the present disclosure.

With the electronic equipment, the wireless communication method, and the computer-readable storage medium according to the present disclosure, the user equipment determines a receiving beam according to channel quality under each preset interference scenario, a transmitting beam of the network side equipment and a preset interference scenario where the electronic equipment is located, such that a signal to interference plus noise ratio obtained for the receiving beam is the largest. In this way, the user equipment can select a beam with the largest signal to interference plus noise ratio as the receiving beam, thereby reducing interference between cells.

From the description provided here, further areas of applicability will become apparent. The description and specific examples in this summary are for illustration only, and are not intended to limit the scope of the present disclosure.

BRIEF DESCRIPTION OF THE DRAWINGS

The drawings described herein are only for illustrating selected embodiments rather than all possible implementations, and are not intended to limit the scope of the present disclosure. In the drawings.

Figure 1A:
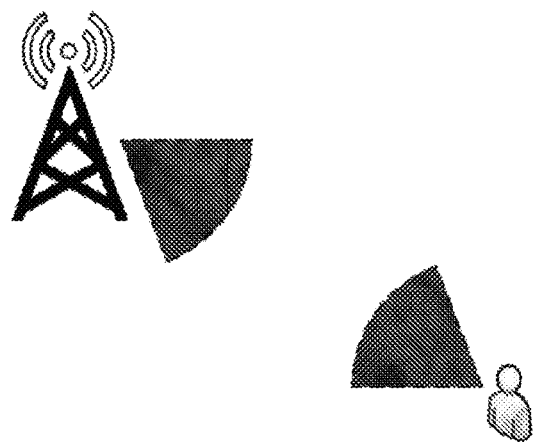
FIG. 1 (a) is a schematic diagram showing a rough beam pairing process.
FIG. 1(b) is a schematic diagram showing an exact beam pairing process.

Although the present disclosure is susceptible of various modifications and alternative forms, specific embodiments thereof have been shown in the drawings as examples and described in detail herein. However, it should be understood that the description of specific embodiments herein is to cover all modifications, equivalents, and substitutions that fall within the spirit and scope of the present disclosure, rather than intended to limit the present disclosure to the specific forms disclosed. It should be noted that throughout the drawings, corresponding reference numerals indicate corresponding components.

DETAILED DESCRIPTION OF EMBODIMENTS

Examples of the present disclosure are described below more fully with reference to the drawings. The following description is merely illustrative in nature, rather than intended to limit the present disclosure, application, or use.

Illustrative embodiments are provided so that the present disclosure is thorough and the scope of the present disclosure is fully conveyed to those skilled in the art. Numerous specific details such as examples of specific components, equipment, and methods are described to provide a detailed understanding of the embodiments of the present disclosure. It is clear to those skilled in the art that the example embodiments can be implemented in many different forms without these specific details, and none of them should be construed as limiting the scope of the present disclosure. In some example embodiments, well-known processes, well-known structures, and well-known technologies are not described in detail.

The description will be made in the following order:
1. Description of problems;
2. Configuration example of electronic equipment on a user side;
3. Configuration example of electronic equipment on a network side;
4. Method embodiment;
5. Application examples.

1. Description of Problems

Figure 1B:
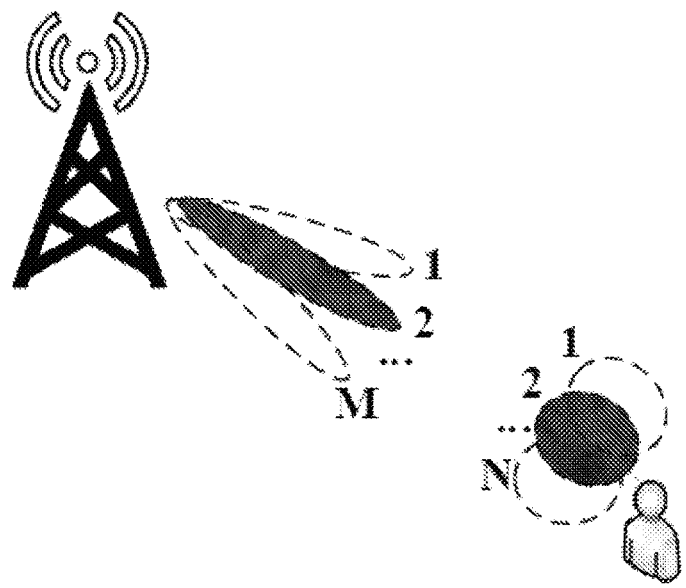

FIG. 1(a) is a schematic diagram showing a rough beam pairing process, and FIG. 1(b) is a schematic diagram showing an exact beam pairing process. As shown in FIG. 1(a), when the user equipment initially accesses the base station, a pair of transmitting and receiving beams are roughly established between the user equipment and the base station through the measurement of the base station by the user equipment. The beam of the base station is usually wider to reduce beam search time period of the user equipment during the initial access process. Through the rough beam pairing process, both the base station and the user equipment acquire an approximate direction of a signal. According to this direction, the base station and the user equipment determine several candidate beams that are close to this direction, and then refine the pair of transmitting and receiving beams to achieve exact beam pairing. As shown in FIG. 1(b), the base station has M beams, and the user equipment has N beams. In the exact beam pairing process, the base station uses a beam with a narrower width and higher gain.

As mentioned above, interference between cells is not considered in the traditional beam management process. In fact, since the receiving beam of the user equipment is often wide, the user equipment has a higher probability of receiving an interference signal from the network side equipment of the neighboring cell. As a result, an SINR (Signal to Interference plus Noise Ratio) of the signal received by the user equipment is significantly reduced.

Figure 2A:
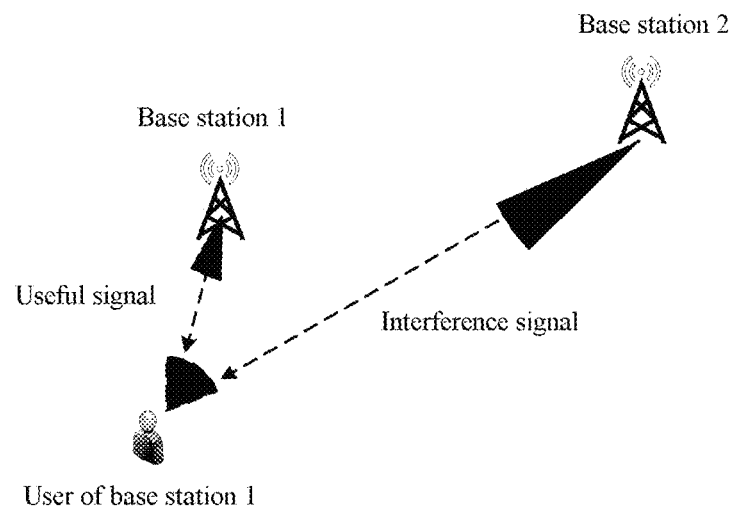
FIG. 2(a) is a schematic diagram showing an interference scenario according to an embodiment of the present disclosure.
Figure 2B:
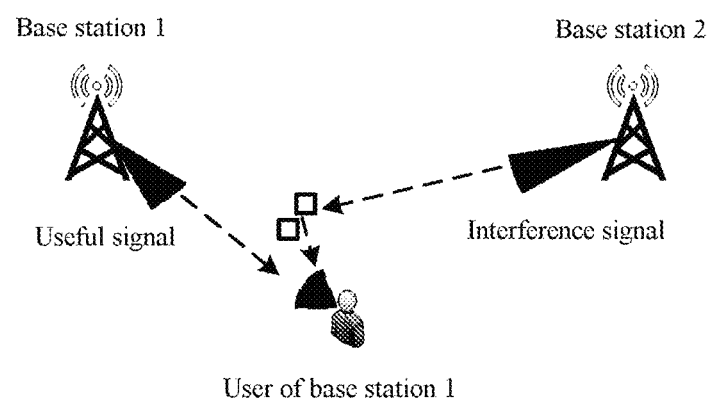
FIG. 2(b) is a schematic diagram showing an interference scenario according to an embodiment of the present disclosure.

FIG. 2(a) is a schematic diagram showing an interference scenario according to an embodiment of the present disclosure. As shown in FIG. 2(a), a user of a base station 1 receives a signal from the base station 1, which is a useful signal. Further, a transmitting beam of the base station 2 is also directed at the user. If transmission power of the base station 2 is relatively large, the base station 2 may strongly interfere with the user. A signal from the base station 2 is an interference signal. FIG. 2(b) is a schematic diagram showing an interference scenario according to another embodiment of the present disclosure. As shown in FIG. 2(b), the user of the base station 1 receives a signal from the base station 1, which is a useful signal. The user of the base station 1 also receives a signal from the base station 2 after reflection. That is, the user is interfered by the base station 2. Although the interference signal from the base station 2 is a non-direct interference signal, the interference signal still affects quality of the signal received by the user, resulting in performance loss.

According to the present disclosure, electronic equipment in a wireless communication system, a wireless communication method performed by the electronic equipment in the wireless communication system, and a computer-readable storage medium are provided for such a scenario, to consider the interference of neighboring cells in the beam management process, so that the user equipment selects a receiving beam reasonably, thereby reducing the interference between cells.

The network side equipment according to the present disclosure is any type of TRP (Transmit and Receive Port). In addition, the network-side equipment described in the present disclosure is a base station device, for example, an eNB, a gNB (base station in the 5th generation communication system), a macro base station, or a small base station.

The user equipment according to the present disclosure may be a mobile terminal (such as a smartphone, a tablet personal computer (PC), a notebook PC, a portable game terminal, a portable/dongle type mobile router, and a digital camera) or a vehicle-mounted terminal (such as a vehicle navigation device). The user equipment may also be implemented as a terminal (also referred to as a machine type communication (MTC) terminal) that performs machine-to-machine (M2M) communication. In addition, the user equipment may be a wireless communication module (such as integrated circuitry module including a single chip) mounted on each of the aforementioned terminals.

2. Configuration Example of Electronic Equipment on a User Side

Figure 3:
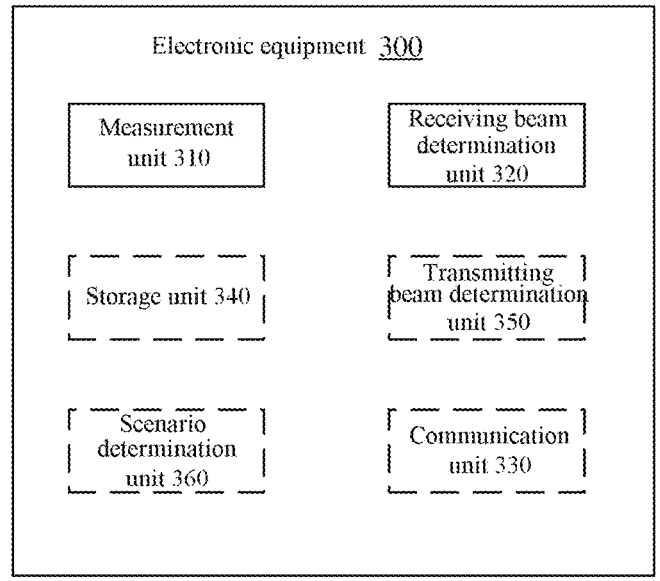
FIG. 3 is a block diagram showing an example of configuration of electronic equipment on a user side according to an embodiment of the present disclosure.

FIG. 3 is a block diagram showing an example of configuration of electronic equipment 300 according to an embodiment of the present disclosure. The electronic equipment 300 here may serve as user equipment in a wireless communication system.

As shown in FIG. 3, the electronic equipment 30) includes a measurement unit 310 and a receiving beam determination unit 320.

Here, all units of the electronic equipment 300 may be included in the processing circuitry. It should be noted that the electronic equipment 300 may include one processing circuitry or multiple processing circuitry. Further, the processing circuitry may include various discrete functional units to perform various different functions and/or operations. It should be noted that these functional units may be physical entities or logical entities, and units with different titles may be implemented by the same physical entity.

According to an embodiment of the present disclosure, the measurement unit 310 performs a beam measurement process to determine channel quality between each receiving beam of the electronic equipment 300 and each transmitting beam of network side equipment serving the electronic equipment 300 under each preset interference scenario.

According to an embodiment of the present disclosure, the receiving beam determination unit 320 determines a receiving beam according to channel quality under each preset interference scenario, a transmitting beam of the network side equipment and a preset interference scenario where the electronic equipment 300 is located, such that a signal to interference plus noise ratio obtained when the electronic equipment 300 receives a signal using the determined receiving beam is the largest.

In the embodiment of the present disclosure, the preset interference scenario represents interference conditions of network side equipment around the electronic equipment 300 to the electronic equipment 300. Here, the network side equipment around the electronic equipment 300 includes network side equipment in a cell adjacent to the cell where the electronic equipment 300 is located. The wireless communication system where the electronic equipment 300 is located is a homogeneous wireless communication system or a heterogeneous wireless communication system. For example, the network side equipment in the cell adjacent to the cell where the electronic equipment 300 is located and the network side equipment in the cell where the electronic equipment 300 is located both are macro base stations. In another example, the network side equipment in the cell adjacent to the cell where the electronic equipment 300 is located is a macro base station, and the network side equipment in the cell where the electronic equipment 300 is located is a small base station. The preset interference scenario is an ideal interference scenario. Each preset interference scenario includes the determination of "interference to the electronic equipment 300" and "no interference to the electronic equipment 300" from each network side equipment around the electronic equipment 300. It is assumed that that there are Q cells adjacent to the cell where the electronic equipment 300 is located. Since each network-side equipment in the neighboring cell has two situations that cause interference to the electronic equipment 300 and does not cause interference to the electronic equipment 300, there are $K=2^Q$ preset interference scenarios in theory. For example, if there is a cell adjacent to the cell where the electronic equipment 300 is located, the first preset interference scenario is, for example, that network side equipment in the neighboring cell causes interference to the electronic equipment 300, and the second preset interference scenario is, for example, that the network side equipment in the neighboring cell that does not cause interference to the electronic equipment 300.

Figure 4A:
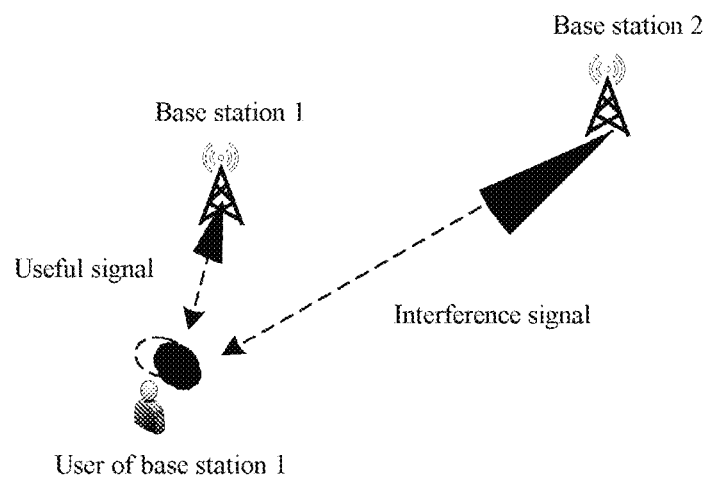
FIG. 4(a) is a schematic diagram showing selection of a receiving beam according to the conventional technology.

FIG. 4(a) is a schematic diagram showing selection of a receiving beam in the conventional technology. In FIG. 4(a), the user of a base station 1 is served by the base station 1. A downlink signal sent by the base station 1 to the user of the base station 1 is a useful signal, and a downlink signal sent by a base station 2 in a neighboring cell is an interference signal for the user of the base station 1. In the existing receiving beam selection solution, the user equipment selects the receiving beam based on an RSRP of the cell. That is, the user equipment selects a receiving beam with largest received power to receive the downlink information. As shown in FIG. 4(a), the user of the base station 1 selects a beam represented by a black solid ellipse as the receiving beam based on the RSRP. Since the interference from a neighboring cell is not considered, the user is likely to receive strong interference from the base station 2, resulting in a decrease in system performance.

Figure 4B:
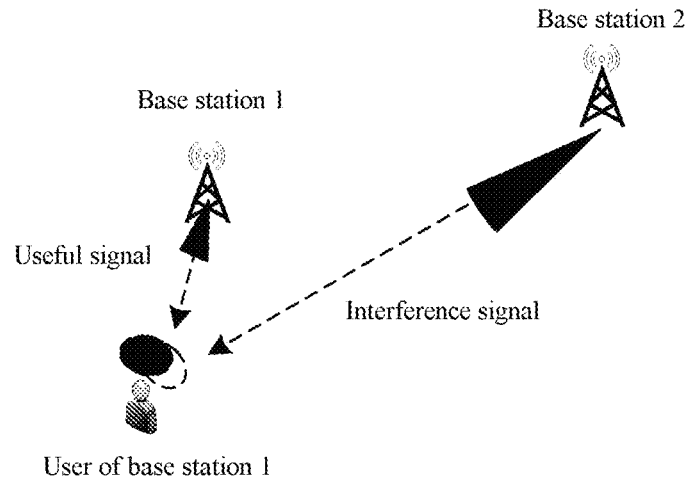
FIG. 4(b) is a schematic diagram showing selection of a receiving beam according to an embodiment of the present disclosure.

FIG. 4(b) is a schematic diagram showing selection of a receiving beam according to an embodiment of the present disclosure. According to the embodiment of the present disclosure, the user equipment selects a receiving beam based on the signal to interference plus noise ratio. That is, the user equipment selects a receiving beam with a largest SINR to receive the downlink information. As shown in FIG. 4(b), the user of the base station 1 selects a beam represented by a black solid ellipse as the receiving beam based on the SINR. Although the received power of the beam is not the maximum, since the interference from a neighboring cell is considered, the interference signal from the base station 2 can be avoided and the system performance can be improved.

According to an embodiment of the present disclosure, the beam measurement process performed by the measurement unit 310 includes a measurement process on the NZP CSI-RS resource set and a measurement process on the ZP CSI-RS resource set. Alternatively, the beam measurement process performed by the measurement unit 310 includes a measurement process on an SSB (synchronization signal block) resource set and a measurement process on a ZP CSI-RS resource set.

According to an embodiment of the present disclosure, the measurement unit 310 performs measurement on the NZP CSI-RS resource set or the SSB resource set, so as to determine a useful signal power matrix. Each element in the useful signal power matrix represents useful signal power obtained when the network side equipment uses a specific transmitting beam to transmit a signal and the electronic equipment uses a specific receiving beam to receive the signal in a preset interference scenario. In the following, the embodiments of the present disclosure are described with NZP CSI-RS resources, and these embodiments are also applicable to SSB resources.

According to the embodiment of the present disclosure, the NZP CSI-RS resource in the NZP CSI-RS resource set corresponds to the transmitting beam of the network side equipment. Specifically, the NZP CSI-RS resource and the transmitting beam of the network side equipment are in one-to-one correspondence. That is, for each NZP CSI-RS resource, there is a unique transmitting beam corresponding to the NZP CSI-RS resource, and different NZP CSI-RS resources correspond to different transmitting beams. In addition, the NZP CSI-RS resources and the transmitting beam of the network side equipment may be in many-to-one correspondence. In other words, for each NZP CSI-RS resource, there is a unique transmitting beam corresponding to the NZP CSI-RS resource, and different NZP CSI-RS resources correspond to the same transmitting beam.

According to an embodiment of the present disclosure, as shown in FIG. 3, the electronic equipment 300 further includes a communication unit 330. The communication unit 330 is configured to receive configuration information from the network side equipment. The configuration information includes correspondence between the NZP CSI-RS resource and the transmitting beam. Therefore, the electronic equipment 300 determines the correspondence between the NZP CSI-RS resource and the transmitting beam according to the configuration information from the network side equipment. Furthermore, as shown in FIG. 3, the electronic equipment 300 further includes a storage unit 340. The storage unit 340 is configured to store the correspondence between the NZP CSI-RS resource and the transmitting beam.

According to an embodiment of the present disclosure, the measurement unit 310 performs measurement on the NZP CSI-RS resource set to determine the useful signal power matrix. Here, the useful signal power matrix has nothing to do with the preset interference scenario. In other words, for any preset interference scenario, the useful signal power matrix is the same.

According to the embodiment of the present disclosure, assuming that the network side equipment is provided with M transmitting beams and the electronic equipment 300 is provided with N receiving beams, a useful signal power matrix P is an M×N-dimensional matrix. An element $P_{i,j}$ ($1 \leq i \leq M$, $1 \leq j \leq N$) represents useful signal power obtained when the network side equipment uses an i-th transmitting beam to transmit a signal and the electronic equipment 300 uses a j-th receiving beam to receive the signal. The useful signal power matrix P is shown below.

$$P = \begin{bmatrix} p_{1,1} & \cdots & p_{1,N} \\ \vdots & \ddots & \vdots \\ p_{M,1} & \cdots & p_{M,N} \end{bmatrix}$$

According to the embodiment of the present disclosure, the user equipment uses each of the N receiving beams to perform measurement on each NZP CSI-RS resource in the NZP CSI-RS resource set, thereby completing M×N measurements to determine the above useful signal power matrix P.

According to an embodiment of the present disclosure, the measurement unit 310 performs measurement on the ZP CSI-RS resource set, so as to determine the interference signal power obtained when the electronic equipment 300 receives a signal using each receiving beam in each preset interference scenario.

According to an embodiment of the present disclosure, the ZP CSI-RS resource in the ZP CSI-RS resource set corresponds to the preset interference scenario. Specifically, the ZP CSI-RS resource set has a one-to-one correspondence with the preset interference scenario. That is, for each ZP CSI-RS resource set, there is a unique preset interference scenario corresponding to ZP CSI-RS resource set, and different ZP CSI-RS resource sets correspond to different preset interference scenarios. In other words, the preset interference scenario corresponds to multiple ZP CSI-RS resources in the same ZP CSI-RS resource set.

According to an embodiment of the present disclosure, the electronic equipment 300 receives configuration information from the network side equipment through the communication unit 330. The configuration information includes the correspondence between the ZP CSI-RS resource set and the preset interference scenario. Therefore, the electronic equipment 300 determines the correspondence between the ZP CSI-RS resource set and the preset interference scenario according to the configuration information from the network side equipment. Further, the storage unit 340 stores the correspondence between the ZP CSI-RS resource set and the preset interference scenario.

Figure 5:
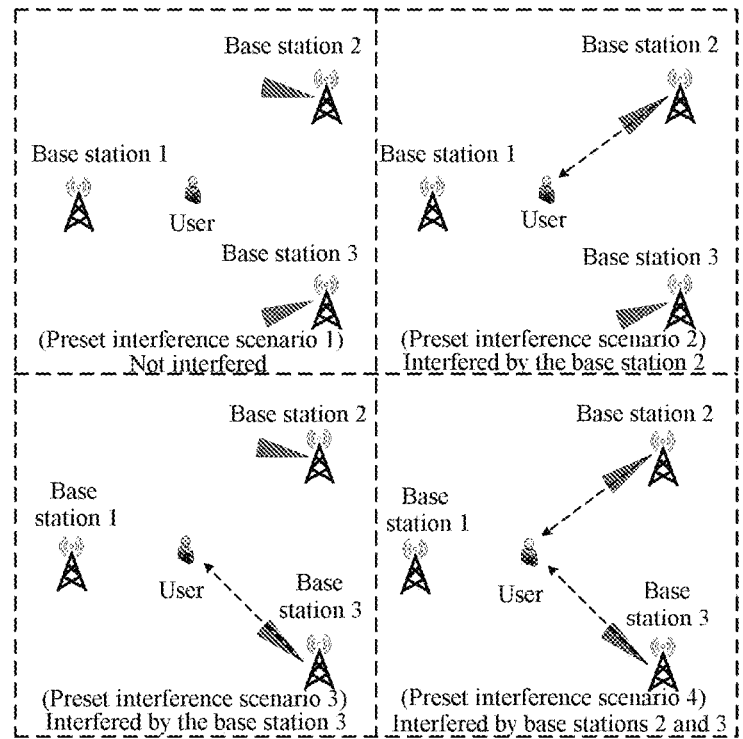
FIG. 5 is a schematic diagram showing a preset interference scenario according to an embodiment of the present disclosure.

FIG. 5 is a schematic diagram showing a preset interference scenario according to an embodiment of the present disclosure. In FIG. 5, a base station 1 serves the user, and base stations 2 and 3 are in a cell adjacent to the base station 1. Therefore, FIG. 5 shows examples of four preset interference scenarios. A preset interference scenario 1 indicates that neither the base station 2 nor the base station 3 cause interference to the user. A preset interference scenario 2 indicates that the base station 2 causes interference to the user, and the base station 3 does not cause interference to the user. A preset interference scenario 3 indicates that the base station 3 causes interference to the user, and the base station 2 does not cause interference to the user. The preset interference scenario 4 indicates that both the base station 2 and the base station 3 cause interference to the user.

According to an embodiment of the present disclosure, the ZP CSI-RS resource set corresponds to a preset interference scenario. For example, in the embodiment shown in FIG. 5, there are 4 ZP CSI-RS resource sets respectively corresponding to the 4 preset interference scenarios.

According to an embodiment of the present disclosure, the measurement unit 310 performs measurement on the ZP CSI-RS resource set, so that an interference signal power matrix in each preset interference scenario is determined. Each element in the interference signal power matrix represents the interference signal power obtained when the electronic equipment 300 receives a signal using a receiving beam. Here, the interference signal power matrix is for a specific preset interference scenario, that is, the number of interference signal power matrices is the same as the number of preset interference scenarios.

Assuming that the number of preset interference scenarios is K, a matrix $I^k$ represents the interference signal power matrix of a k-th preset interference scenario, where $1 \leq k \leq K$.

Similarly, assuming that the electronic equipment 300 is provided with N receiving beams, the matrix $I^k$ is a 1×N-dimensional matrix. An element $i_t^k$ ($1 \leq t \leq N$) represents the interference signal power obtained w % ben the electronic equipment 300 uses a t-th receiving beam to receive a signal in a k-th preset interference scenario. The interference signal power matrix $I^k$ is shown below.

$$I^k = [i_1^k, \ldots, i_N^k]$$

According to the embodiment of the present disclosure, in a preset interference scenario, on the ZP CSI-RS resource set corresponding to the preset interference scenario, network-side equipment that causes interference to the electronic equipment 300 uses a transmitting beam that causes interference to the electronic equipment 300 to transmit an NZP CSI-RS signal, and network side equipment that does not cause interference to the electronic equipment 300 uses any transmitting beam to transmit a ZP CSI-RS signal. Then, the electronic equipment 300 uses each receiving beam to perform measurement on the ZP CSI-RS resource set corresponding to the preset interference scenario, thereby completing N measurements to determine the interference signal power matrix $I^k$ corresponding to the preset interference scenario.

Figure 6:
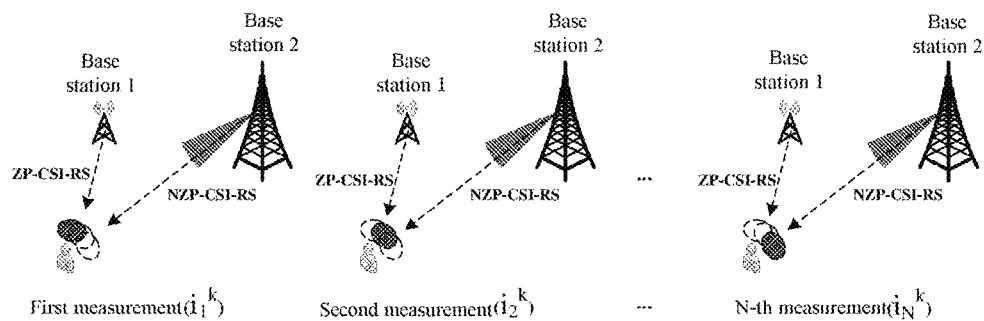
FIG. 6 is a schematic diagram showing acquisition of an interference signal power matrix for a preset interference scenario according to an embodiment of the present disclosure.

FIG. 6 is a schematic diagram showing a process of acquiring an interference signal power matrix for a specific preset interference scenario according to an embodiment of the present disclosure. In FIG. 6, it is assumed that a base station 1 serves the user equipment, and a base station 2 is a neighboring base station of the base station 1. It is assumed here that in the preset interference scenario, the base station 2 causes interference to the user. Then, on the ZP CSI-RS resource set corresponding to the preset interference scenario, the base station 2 uses the transmitting beam that causes interference to the user to transmit the NZP CSI-RS signal, and the base station 1 uses any transmitting beam to transmit the ZP CSI-RS signal. As shown in FIG. 6, the user uses a first receiving beam to perform measurement, that is, a first measurement, on the ZP CSI-RS resource set corresponding to the preset interference scenario, so as to obtain a first element in the interference signal power matrix. The user uses a second receiving beam to perform measurement, that is, a second measurement, on the ZP CSI-RS resource set corresponding to the preset interference scenario so as to obtain a second element in the interference signal power matrix. Similarly, the user uses an N-th receiving beam to perform measurement, that is, an N-th measurement, on the ZP CSI-RS resource set corresponding to the preset interference scenario, so as to obtain an N-th element in the interference signal power matrix. In this way, the user obtains the interference signal power matrix corresponding to the preset interference scenario. Similarly, the user obtains interference signal power matrixes respectively corresponding to other preset interference scenarios.

As described above, in the beam measurement process, the measurement unit 310 obtains a useful signal power matrix P and K interference signal power matrixes.

According to an embodiment of the present disclosure, the electronic equipment 300 receives transmitting beam information from the network side equipment via the communication unit 330. As shown in FIG. 3, the electronic equipment 300 further includes a transmitting beam determination unit 350. The transmitting beam determination unit 350 is configured to determine a transmitting beam of the network side equipment according to the transmitting beam information sent by the network side equipment. Here, the transmitting beam of the network-side equipment refers to the transmitting beam actually used when the network-side equipment transmits downlink information. The network side equipment uses one or more transmitting beams to transmit downlink information.

For example, according to an embodiment of the present disclosure, after the measurement unit 310 determines the useful signal power matrix P, the electronic equipment 300 transmits all or part of the elements of the useful signal power matrix P to the network-side equipment for the network side equipment to determine the actually used transmitting beam according to the all or part of the elements of the useful signal power matrix P.

According to an embodiment of the present disclosure, the electronic equipment 300 further receives information of a preset interference scenario where the electronic equipment 300 is located from the network side equipment via the communication unit 330. As shown in FIG. 3, the electronic equipment 300 further includes a scenario determination unit 360. The scenario determination unit 360 is configured to determine a preset interference scenario where the electronic equipment 300 is located according to the information of the preset interference scenario where the electronic equipment 300 is located sent by the network side equipment. Here, the preset interference scenario where the electronic equipment 30) is located refers to a preset interference scenario where the electronic equipment 300 is actually located.

According to an embodiment of the present disclosure, the transmitting beam determination unit 350 determines the transmitting beam of the network side equipment according to TCI state information from the network side equipment.

Figure 7A:
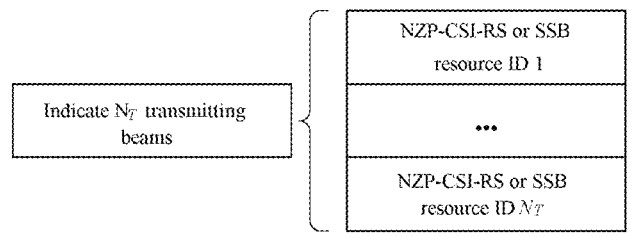
FIG. 7(a) is a schematic diagram showing indication of a transmitting beam by TCI (Transmission Configuration Indication) according to an embodiment of the present disclosure.

FIG. 7(a) is a schematic diagram showing indication of a transmitting beam by TCI state information according to an embodiment of the present disclosure. In FIG. 7(a), it is assumed that the network side equipment uses $N_T$ transmitting beams, where $N_T$ is a positive integer. As shown in FIG. 7(a), each NZP CSI-RS resource or each SSB resource corresponds to one transmitting beam, so that the TCI state received by the electronic equipment 300 includes $N_T$ NZP CSI-RS resource IDs or $N_T$ SSB resource IDs to respectively represent $N_T$ transmitting beams.

Further, the scenario determination unit 360 determines the preset interference scenario where the electronic equipment 300 is located according to DCI (downlink control information) from the network side equipment.

According to an embodiment of the present disclosure, the transmitting beam determination unit 350 determines the transmitting beam of the network side equipment according to the TC state information from the network side equipment. The scenario determination unit 360 determines the preset interference scenario where the electronic equipment 300 is located according to the TCI state information from the network side equipment. In other words, the TCI status information corresponds to both the transmitting beam of the network side equipment and the preset interference scenario where the electronic equipment 300 is located, and may indicate the transmitting beam of the network side equipment or the preset interference scenario where the electronic equipment 300 is located.

Figure 7B:
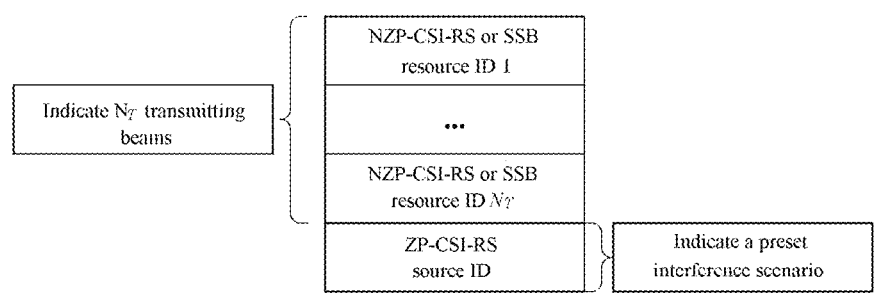
FIG. 7(b) is a schematic diagram showing indication of a transmitting beam and a preset interference scenario by TCI according to an embodiment of the present disclosure.

FIG. 7(b) is a schematic diagram showing indication of a transmitting beam and a preset interference scenario by TCI state information according to an embodiment of the present disclosure. In FIG. 7(b), it is assumed that the network side equipment uses $N_T$ transmitting beams, where $N_T$ is a positive integer. As shown in FIG. 7(b), the TCI state received by the electronic equipment 300 not only includes $N_T$ NZP CSI-RS resource IDs or $N_T$ SSB resource IDs for indicating $N_T$ transmitting beams, but also includes a ZP CSI-RS resource ID for indicating a preset interference scenario. The ZP CSI-RS resource here includes multiple ZP CSI-RS resources in the ZP CSI-RS resource set corresponding to the preset interference scenario.

As described above, the measurement unit 310 determines the signal quality between each receiving beam of the electronic equipment 300 and each transmitting beam of the network side equipment serving the electronic equipment 300 in each preset interference scenario, including a useful signal power matrix P and K interference signal power matrices $I^k$. The transmitting beam determination unit 350 determines one or more transmitting beams actually used by the network side equipment, and the scenario determination unit 360 determines the preset interference scenario where the electronic equipment 300 is actually located. Next, the receiving beam determination unit 320 determines the receiving beam according to the channel quality determined by the measurement unit 310, the transmitting beam of the network-side equipment, and the preset interference scenario where the electronic equipment 300 is located, such that a signal to interference plus noise ratio obtained when the electronic equipment 300 receives a signal using the determined receiving beam is the largest.

The operation of the receiving beam determination unit 320 is described in detail below.

According to an embodiment of the present disclosure, the receiving beam determination unit 320 determines, based on the transmitting beam of the network side equipment and the useful signal power matrix, the useful signal power obtained when the electronic equipment 300 receives a signal using each receiving beam. That is, for the m-th transmitting beam (where 1≤m≤M) of the M transmitting beams of the network side equipment, a useful signal power obtained by the electronic equipment 300 when receiving a signal using each of the N receiving beams is $p_{m1}, p_{m2}, \ldots p_{mN}$, that is, N elements in an m-th row in the useful signal power matrix.

According to an embodiment of the present disclosure, the receiving beam determination unit 320 determines the interference signal power obtained when the electronic equipment 300 receives a signal using each receiving beam according to a preset interference scenario where the electronic equipment 300 is located. That is, when the preset interference scenario where the electronic equipment 300 is located is the k-th preset interference scenario among the K preset interference scenarios, the interference signal power obtained when the electronic equipment 300 uses each of the N receiving beams to receive a signal is $i_1^k, i_2^k, \ldots, i_N^k$, that is, N elements in the interference signal power matrix $I^k$.

According to an embodiment of the present disclosure, the receiving beam determination unit 320 determines a signal to interference plus noise ratio according to the useful signal power and the interference signal power obtained when the electronic equipment 300 uses each receiving beam to receive a signal. That is, when the preset interference scenario where the electronic equipment 300 is located is the k-th preset interference scenario among the K preset interference scenarios, and the network side equipment uses the m-th transmitting beam among the M transmitting beams, the signal to interference plus noise ratio $SINR_n$ obtained when the electronic equipment 300 uses the n-th receiving beam among the N receiving beams to receive signals is:

$$SINR_n = \frac{p_{m,n}}{i_n^k + P_{noise}}$$

$P_{noise}$ means thermal noise; $P_{m,n}$ represents the useful signal power when the network side equipment uses the m-th transmitting beam to transmit downlink information, and the electronic equipment 300 uses the n-th receiving beam to receive the downlink information, that is, an element in the m-th row and the n-th column in the useful signal power matrix P; $i_n^k$ represents interference signal power when the electronic equipment 300 is in the k-th preset interference scenario and uses the n-th receiving beam to receive downlink information, that is, an n-th element in the interference signal power matrix $I^k$ of the k-th preset interference scenario.

According to an embodiment of the present disclosure, the receiving beam determination unit 320 selects $N_R$ ($N_R$ is a positive integer) receiving beams with the largest signal to interference plus noise ratio as beams for receiving downlink information. When the receiving beam determination unit 320 selects a receiving beam, a beam n* for receiving the downlink information is:

$$n^* = \underset{n}{\operatorname{argmax}}\left(\frac{p_{m,n}}{i_n^k + P_{noise}}\right)$$

Wherein $$\underset{n}{\operatorname{argmax}}(\ )$$

represents a value of n that maximizes a variable in parentheses. When the receiving beam determination unit 320 selects multiple receiving beams, the first several receiving beams with the largest signal to interference plus noise ratio are selected.

According to an embodiment of the present disclosure, when the network side equipment uses multiple transmitting beams, the receiving beam determination unit 320 adopts a similar method to select a receiving beam. For example, in the case where the network side equipment uses the $m_1$, $m_2$ ... $m_{NT}$ transmitting beams ($1 \leq m_1, m_2, \ldots, m_{NT} \leq M$) among the M transmitting beams, the receiving beam determination unit 320 determines that the useful signal power obtained when the electronic equipment 300 receives a signal using the n-th receiving beam among the N receiving beams is $\Sigma_{t=1}^{N_T} p_{m_t,n}$, that is, a sum of elements in the $m_1$ row and the n-th column, the $m_2$ row and the n-th column, . . . , the $m_{NT}$ row and the n-th column in the useful signal power matrix P.

Therefore, in a case that the preset interference scenario where the electronic equipment 300 is located is the k-th preset interference scenario among the K preset interference scenarios and the network side equipment uses the $m_1$, $m_2$, . . . $m_{NT}$ transmitting beams among the M transmitting beams, a signal to interference plus noise ratio $SINR_n$ obtained when the electronic equipment 300 uses the n-th receiving beam among the N receiving beams to receive the signal is:

$$SINR_n = \frac{\sum_{t=1}^{N_T} p_{m_t,n}}{i_n^k + P_{noise}}$$

$P_{noise}$ represents thermal noise; $i_n^k$ represents the interference signal power when the electronic equipment 300 is in the k-th preset interference scenario and uses the n-th receiving beam to receive downlink information, that is, an n-th element in the interference signal power matrix $I^k$ of the k-th preset interference scenario.

According to an embodiment of the present disclosure, the receiving beam determination unit 320 selects $N_R$ ($N_R$ is a positive integer) receiving beams with the largest signal to interference plus noise ratio as beams for receiving downlink information. When the receiving beam determination unit 320 selects a receiving beam, a beam n* for receiving downlink information is:

$$n^* = \underset{n}{\operatorname{argmax}}\left(\frac{\sum_{t=1}^{N_T} p_{m_t,n}}{i_n^k + P_{noise}}\right)$$

$$\underset{n}{\operatorname{argmax}}(\ )$$

represents a value of n that maximizes a variable in parentheses. When the receiving beam determination unit 320 selects multiple receiving beams, the first multiple receiving beams with the largest signal to interference plus noise ratio are selected.

It can be seen that, according to the embodiment of the present disclosure, the electronic equipment 300 measures the interference signal power for each preset interference scenario, so that the electronic equipment 300 determines the interference signal power when using each receiving beam to receive a signal according to the preset interference scenario where the electronic equipment 300 is actually located. Further, according to the embodiments of the present disclosure, the electronic equipment 300 selects the receiving beam according to the signal to interference plus noise ratio, thereby taking into account the interference from a neighboring cell, so that the signal to interference plus noise ratio is large when the electronic equipment 300 uses the selected receiving beam to receive downlink information. Therefore, interference between cells can be avoided or reduced.

3. Configuration Example of Electronic Equipment on a Network Side

Figure 8:
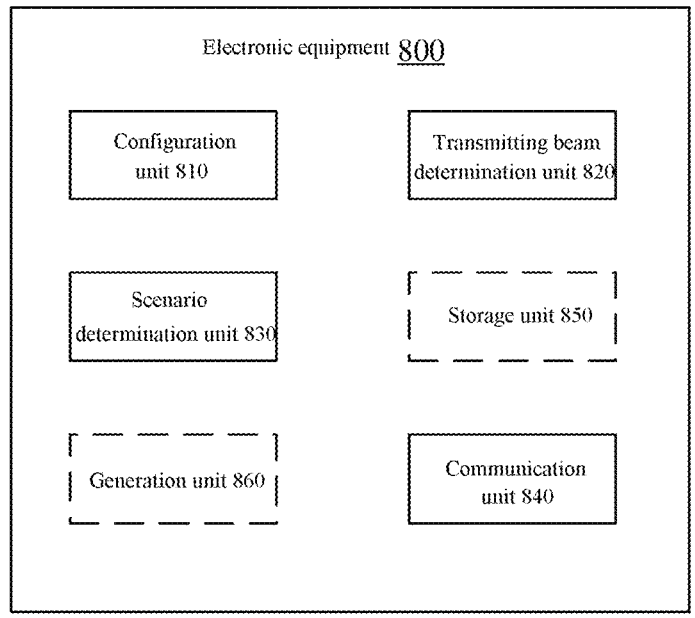
FIG. 8 is a block diagram showing an example of configuration of electronic equipment on a network side according to an embodiment of the present disclosure.

FIG. 8 is a block diagram showing a structure of electronic equipment 800 serving as a network side equipment in a wireless communication system according to an embodiment of the present disclosure.

As shown in FIG. 8, the electronic equipment 800 includes a configuration unit 810, a transmitting beam determination unit 820, a scenario determination unit 830, and a communication unit 840.

Here, each unit of the electronic equipment 800 may be included in the processing circuitry. It should be noted that the electronic equipment 800 may include one processing circuitry or multiple processing circuitry. Further, the processing circuitry may include various discrete functional units to perform various different functions and/or operations. It should be noted that these functional units may be physical entities or logical entities, and units with different names may be implemented by the same physical entity.

According to an embodiment of the present disclosure, the configuration unit 810 configures an NZP CSI-RS resource set and a ZP CSI-RS resource set for the user equipment so that the user equipment performs a beam measurement process. Here, as described above, the user equipment performs a beam measurement process to determine the channel quality between each receiving beam of the user equipment and each transmitting beam of the electronic equipment 800 in each preset interference scenario.

According to an embodiment of the present disclosure, the transmitting beam determination unit 820 determines the transmitting beam of the electronic equipment 800 to transmit downlink information to the user equipment, and then the electronic equipment 800 transmits the transmitting beam of the electronic equipment to the user equipment via the communication unit 840.

According to an embodiment of the present disclosure, the scenario determination unit 830 determines a preset interference scenario where the user equipment is located. Here, the preset interference scenario where the user equipment is located is an actual interference scenario where the user equipment is located. Further, the electronic equipment 800 transmits the preset interference scenario where the user equipment is located to the user equipment via the communication unit 840.

Here, as described above, the user equipment determines the receiving beam according to the channel quality in each preset interference scenario, the transmitting beam of the electronic equipment 800, and the preset interference scenario where the user equipment is located, so that signal to interference plus noise ratio obtained when the user equipment uses the determined receiving beam to receive the signal is the largest.

According to an embodiment of the present disclosure, the preset interference scenario indicates the interference conditions of other network side equipment adjacent to the electronic equipment 800 to the user equipment.

As described above, according to the embodiment of the present disclosure, the electronic equipment 800 configures the NZP CSI-RS resource set and the ZP CSI-RS resource set for the user equipment so that the user equipment performs the beam measurement, and transmits to the user equipment the preset interference scenario where the user equipment is located and the transmitting beam used by the electronic equipment 800. In this way, the user equipment determines the receiving beam according to the channel quality in each preset interference scenario, the transmitting beam of the electronic equipment 800, and the preset interference scenario where the user equipment is located, so as to maximize the signal to interference plus noise ratio of the received beam. In this way, the user equipment selects the beam with the largest signal to interference plus noise ratio as the receiving beam, thereby reducing interference between cells.

According to an embodiment of the present disclosure, the configuration unit 810 configures the NZP CSI-RS resource set for the user equipment so that the NZP CSI-RS resource in the NZP CSI-RS resource set corresponds to the transmitting beam of the electronic equipment 800.

According to an embodiment of the present disclosure, the NZP CSI-RS resource in the NZP CSI-RS resource set is in one-to-one correspondence or many-to-one correspondence with the transmitting beam of the electronic equipment 800. As shown in FIG. 8, the electronic equipment 800 further includes a storage unit 850. The storage unit 850 is configured to store the correspondence between the NZP CSI-RS resource in the NZP CSI-RS resource set and the transmitting beam of the electronic equipment 800. Therefore, both the electronic equipment 800 and the user equipment know and store the correspondence between the NZP CSI-RS resource in the NZP CSI-RS resource set and the transmitting beam of the electronic equipment 800. In other words, for any NZP CSI-RS resource ID, a unique transmitting beam corresponding to the NZP CSI-RS resource ID is determined.

According to an embodiment of the present disclosure, the electronic equipment 800 configures an NZP CSI-RS resource set for the user equipment, and transmits the NZP CSI-RS at a time-frequency position of the NZP CSI-RS resource configured for the user equipment. In this way, the user equipment measures the NZP CSI-RS resource set to determine the useful signal power matrix P. Each element in the useful signal power matrix represents useful signal power obtained when the electronic equipment 800 uses a specific transmitting beam to transmit a signal and the user equipment uses a specific receiving beam to receive the signal in each preset interference scenario. This has been described in detail above, and is not repeated here.

According to an embodiment of the present disclosure, the electronic equipment 800 receives all or part of the elements in the useful signal power matrix P from the user equipment via the communication unit 840. That is, the user equipment transmits all the elements in the useful signal power matrix P to the electronic equipment 800, or transmits some elements of the useful signal power matrix P with larger values to the electronic equipment 800.

According to an embodiment of the present disclosure, the transmitting beam determination unit 820 determines the transmitting beam of the electronic equipment 800 according to all or part of the elements in the useful signal power matrix P received from the user equipment. For example, the transmitting beam determination unit 820 selects a transmitting beam with a larger useful signal power obtained when the user equipment receives a signal as a beam for transmitting a downlink signal. Here, the transmitting beam determination unit 820 determines one transmitting beam, or determines multiple transmitting beams.

According to an embodiment of the present disclosure, the configuration unit 810 configures a ZP CSI-RS resource set for the user equipment so that the ZP CSI-RS resource in the ZP CSI-RS resource set corresponds to a preset interference scenario.

According to an embodiment of the present disclosure, the ZP CSI-RS resource set is in one-to-one correspondence with a preset interference scenario. That is, the ZP CSI-RS resource in a ZP CSI-RS resource set corresponds to a preset interference scenario. According to the embodiment of the present disclosure, the storage unit 850 stores the correspondence between the ZP CSI-RS resource in the ZP CSI-RS resource set and the preset interference scenario. Therefore, both the electronic equipment 800 and the user equipment know and store the correspondence between the ZP CSI-RS resource in the ZP CSI-RS resource set and the preset interference scenario. In other words, for any ZP CSI-RS resource ID, a unique preset interference scenario corresponding to the ZP CSI-RS resource ID is determined.

According to an embodiment of the present disclosure, the electronic equipment 800 configures a ZP CSI-RS resource set for the user equipment, so that the user equipment performs measurement on the ZP CSI-RS resource set, for the user equipment to determine the interference signal power obtained when using each receiving beam to receive the signal in the preset interference scenario corresponding to the ZP CSI-RS resource, that is, to determine the interference signal power matrix of the preset interference scenario corresponding to the ZP CSI-RS resource.

According to an embodiment of the present disclosure, as shown in FIG. 8, the electronic equipment 800 further includes a generation unit 860 for generating reference signal coordination signaling. The reference signal coordination signaling includes the time-frequency position of the ZP CSI-RS resource corresponding to a specific preset interference scenario, the reference signal type sent by other network side equipment at the time-frequency position of the ZP CSI-RS resource, and a transmitting beam when other network side equipment transmits a reference signal on the time-frequency position of the ZP CSI-RS resource. Further, according to an embodiment of the present disclosure, the electronic equipment 800 transmits the reference signal coordination signaling for a specific preset interference scenario to each other network-side equipment adjacent to the electronic equipment 800 via the communication unit 840.

According to the embodiment of the present disclosure, the reference signal coordination signaling is directed to other network side equipment, and is also directed to a preset interference scenario. That is, for each other network side equipment adjacent to the electronic equipment 800 and for each preset interference scenario, the electronic equipment 800 generates a reference signal coordination signaling and transmits the reference signal coordination signaling.

Figure 9:
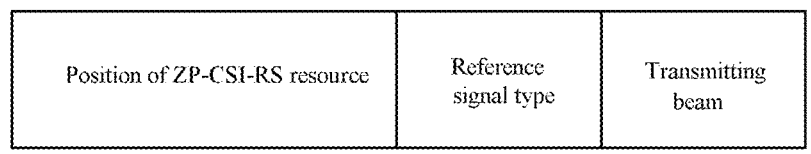
FIG. 9 is a schematic diagram showing reference signal coordination signaling according to an embodiment of the present disclosure.

FIG. 9 is a schematic diagram showing reference signal coordination signaling according to an embodiment of the present disclosure. As shown in FIG. 9, the reference signal coordination signaling includes a position of the ZP CSI-RS resource, a reference signal type, and a transmitting beam.

According to an embodiment of the present disclosure, the position of the ZP CSI-RS resource indicates the position of the ZP CSI-RS resource corresponding to a specific preset interference scenario, including a time domain position and a frequency domain position.

According to an embodiment of the present disclosure, the reference signal type indicates the type of reference signal sent by other network side equipment that receives the reference signal coordination signaling at the time-frequency position of the ZP CSI-RS resource. The reference signal type includes NZP CSI-RS and ZP CSI-RS. For example, the reference signal type of NZP CSI-RS indicates that other network side equipment receiving the reference signal coordination signaling transmits NZP CSI-RS at the time-frequency position of the ZP CSI-RS resource. The reference signal type of ZP CSI-RS indicates that other network-side equipment receiving the reference signal coordination signaling transmits ZP CSI-RS on the time-frequency position of the ZP CSI-RS resource.

According to the embodiment of the present disclosure, the transmitting beam refers to the transmitting beam when the other network side equipment transmits the reference signal on the time-frequency position of the ZP CSI-RS resource.

According to the embodiment of the present disclosure, when other network side equipment cause interference to the user equipment in a preset interference scenario corresponding to ZP CSI-RS resources, the reference signal type is NZP CSI-RS, and the transmitting beam is a beam that causes interference to the user equipment. When other network-side equipment does not cause interference to the user equipment in the preset interference scenario corresponding to the ZP CSI-RS resource, the reference signal type is ZP CSI-RS, and the transmitting beam is an arbitrary beam. In the case that the transmitting beam is an arbitrary beam, the transmitting beam in the reference signal coordination signaling is set to zero.

Here, the electronic equipment 800 determines the beam where other network side equipment cause interference to the user equipment according to historical information. For example, the electronic equipment 800 determines the beam where other network-side equipment causes interference to the user equipment according to a previous interference measurement process. In the interference measurement, the electronic equipment 800 configures ZP CSI-RS resources for the user equipment, and other network-side equipment in a neighboring cell uses different transmitting beam to transmit NZP CSI-RS on the ZP CSI-RS resources. The user equipment measures RSRP on the ZP CSI-RS resource and feeds the measured RSRP back to the electronic equipment 800. The electronic equipment 800 learns the intensity of interference to the user equipment caused by a different transmitting beam of other network side equipment, so as to determine which beam of other network-side equipment causes interference to the user equipment.

It can be seen that based on the reference signal coordination signaling, other network side equipment knows the position of the ZP CSI-RS resource corresponding to the preset interference scenario, the type of reference signal that is required to be transmitted, and the transmitting beam for transmitting the reference signal.

As described above, according to the embodiment of the present disclosure, in the beam measurement process of the user equipment, in a preset interference scenario, other network side equipment that causes interference to the user equipment uses the transmitting beam that causes interference to the user equipment to transmit NZP CSI-RS, and other network side equipment that does not cause interference to the user equipment uses any transmitting beam to transmit ZP CSI-RS.

In addition, according to an embodiment of the present disclosure, the electronic equipment 800 transmits the ZP CSI-RS at the time-frequency position of the ZP CSI-RS resource configured for the user equipment.

Taking the preset interference scenario 2 shown in FIG. 5 as an example, in the preset interference scenario 2, the base station 1 is implemented by the electronic equipment 800, the base station 2 causes interference to the user equipment, and the base station 3 does not cause interference to the user equipment. According to the embodiment of the present disclosure, the base station 1 transmits the reference signal coordination signaling for the preset interference scenario 2 to the base station 2. The ZP CSI-RS resource position corresponds to the preset interference scenario 2. The reference signal type is NZP CSI-RS. The transmitting beam is the beam that causes interference to the user (where the base station 1 determines the beam that causes the interference to the user by the base station 2 according to historical information). The base station 1 also transmits the reference signal coordination signaling for the preset interference scenario 2 to the base station 3. The ZP CSI-RS resource position corresponds to the preset interference scenario 2. The reference signal type is ZP CSI-RS. The transmitting beam is an arbitrary transmitting beam of the base station 3. In this way, on the ZP CSI-RS resource corresponding to the preset interference scenario 2, the base station 1 and the base station 3 use arbitrary transmitting beams to transmit ZP CSI-RS, and the base station 2 uses a transmitting beam that causes interference to the user to transmit NZP CSI-RS, so that the user determines the interference signal power matrix $I^2$ corresponding to the preset interference scenario 2.

Taking the preset interference scenario 4 shown in FIG. 5 as an example, in the preset interference scenario 4, the base station 1 is implemented by the electronic equipment 800, and both the base station 2 and the base station 3 cause interference to the user equipment. According to the embodiment of the present disclosure, the base station 1 transmits the reference signal coordination signaling for the preset interference scenario 4 to the base station 2. The ZP CSI-RS resource position corresponds to the preset interference scenario 4. The reference signal type is NZP CSI-RS. The transmitting beam is the beam that causes interference to the user (where the base station 1 determines the beam that causes the interference to the user by the base station 2 according to historical information). The base station 1 also transmits the reference signal coordination signaling for the preset interference scenario 4 to the base station 3. The ZP CSI-RS resource position corresponds to the preset interference scenario 4. The reference signal type is NZP CSI-RS. The transmitting beam is the beam that causes interference to the user (where the base station 1 determines the beam that causes the interference to the user by the base station 3 according to historical information). In this way, on the ZP CSI-RS resource corresponding to the preset interference scenario 4, the base station 1 uses any transmitting beam to transmit ZP CSI-RS, and the base station 2 and the base station 3 use transmitting beams that cause interference to the user to transmit NZP CSI-RS, so that the user determines the interference signal power matrix $I^4$ corresponding to the preset interference scenario 4.

As described above, according to the embodiment of the present disclosure, the configuration unit 810 configures the NZP CSI-RS resource for the user equipment, for the user equipment to perform measurement on the NZP CSI-RS resource set to determine the useful signal power matrix P. Further, the configuration unit 810 configures ZP CSI-RS resources for the user equipment, for the user equipment to perform measurement on the ZP CSI-RS resource set to determine each interference signal power matrix $I^k$.

According to an embodiment of the present disclosure, the electronic equipment 800 receives interference beam time information from each other network side equipment adjacent to the electronic equipment 800 via the communication unit 840. The interference beam time information includes interference beam information used by other network side equipment adjacent to the electronic equipment 800 in multiple time periods.

Figure 10:
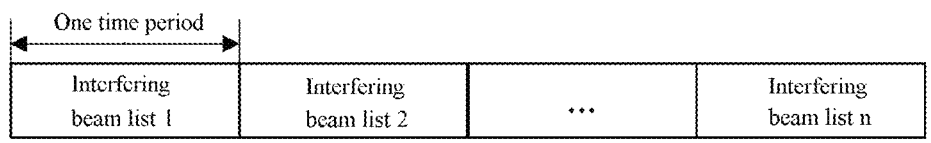
FIG. 10 is a schematic diagram showing interference beam time information according to an embodiment of the present disclosure.

FIG. 10 is a schematic diagram showing interference beam time information according to an embodiment of the present disclosure. As shown in FIG. 10, the interference beam time information includes a list of interference beams of other network side equipment adjacent to the electronic equipment 800 in the multiple time periods. Here, the electronic equipment 800 and other network side equipment adjacent to the electronic equipment 800 agree on a length of a time period, such as one or more time slots, or one or more sub-frames. In addition, other network side equipment determines the interference beam that causes interference to the cell where the electronic equipment 800 is located in each time period according to historical information or empirical information.

According to an embodiment of the present disclosure, the scenario determination unit 830 determines the preset interference scenario where the user equipment is located according to the interference beam time information of each other network side equipment adjacent to the electronic equipment 800. That is, the scenario determination unit 830 determines whether each other network side equipment causes interference to the user equipment according to the interference beam time information from the network side equipment, so as to determine the preset interference scenario where the user equipment is actually located.

According to an embodiment of the present disclosure, the electronic equipment 800 uses DCI to carry the preset interference scenario where the user equipment is located, and uses the TCI state information to carry the transmitting beam of the electronic equipment 800. In other words, the TCI state information corresponds to the transmitting beam of the electronic equipment 800. Therefore, the electronic equipment 800 uses the TC state information to indicate the transmitting beam of the electronic equipment 800.

According to an embodiment of the present disclosure, the electronic equipment 800 establishes the correspondence between the TCI state information and the preset interference scenario where the user equipment is located and the transmitting beam of the electronic equipment, and carries the transmitting beam of the electronic equipment 800 and the preset interference scenario where the user equipment is located through the TC state information.

As described above, according to the embodiments of the present disclosure, the electronic equipment 800 determines the preset interference scenario where the user equipment is actually located, and determines the transmitting beam to be actually used by the electronic equipment 800. In this way, the user equipment selects the receiving beam according to the channel quality information obtained in the beam measurement process, the preset interference scenario where the user equipment is actually located, and the transmitting beam of the electronic equipment 800, thereby taking into account the interference from the neighboring cell, the signal to interference plus noise ratio is large when the user equipment uses the selected receiving beam to receive downlink information. Therefore, interference between cells can be avoided or reduced.

Figure 11:
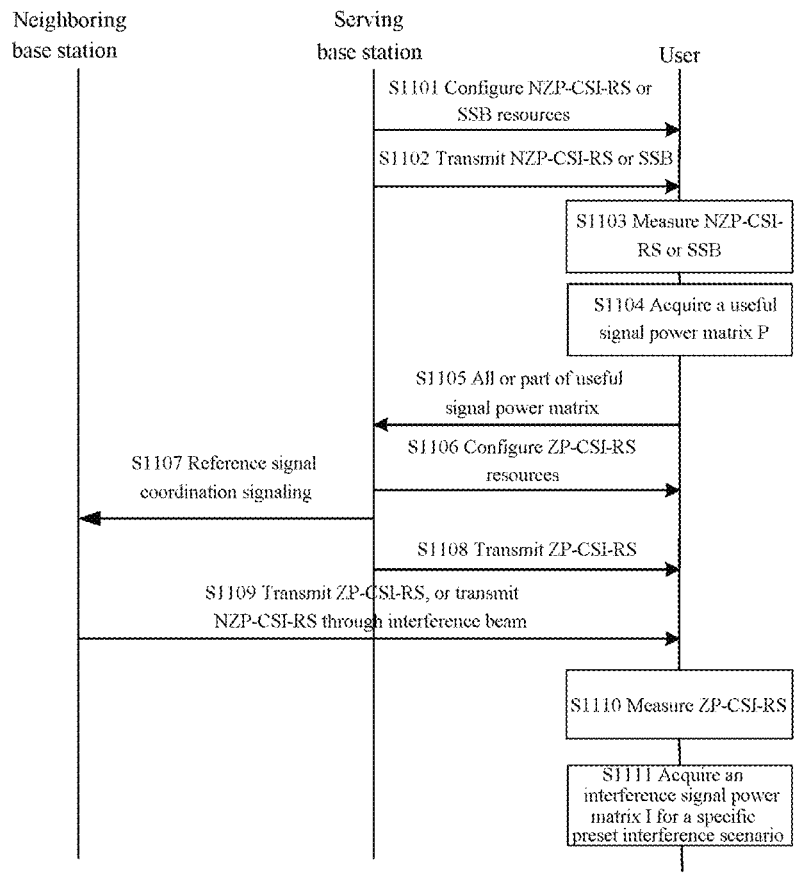
FIG. 11 is a flowchart showing signaling of a beam measurement process according to an embodiment of the present disclosure.

FIG. 11 is a flowchart showing signaling of a beam measurement process according to an embodiment of the present disclosure. In FIG. 11, a serving base station is implemented by electronic equipment 800, and a user is implemented by electronic equipment 300, and a neighboring base station represents a base station device in a cell adjacent to the electronic equipment 800. As shown in FIG. 11, in step S1101, the serving base station configures NZP CSI-RS resources or SSB resources for the user. Next, in step S1102, at a time-frequency position of the configured NZP CSI-RS resource, the serving base station transmits an NZP CSI-RS signal or an SSB signal. Next, in step S1103, the user performs measurement on the configured NZP CSI-RS resource or SSB resource. Next, in step S1104, the user acquires the useful signal power matrix P. Next, in step S1105, the user transmits all or part of the elements in the useful signal power matrix P to the serving base station, so that the serving base station determines the transmitting beam according to the received information. Next, in step S1106, the serving base station configures ZP CSI-RS resources for the user. Next, in step S1107, the serving base station transmits reference signal coordination signaling to each neighboring base station. Next, in step S1108, at the time-frequency position of the configured ZP CSI-RS resource, the serving base station transmits a ZP CSI-RS signal. In step S1109, according to the reference signal coordination signaling, at the time-frequency position of the configured ZP CSI-RS resource, in the preset interference scenario corresponding to the ZP CSI-RS resource the neighboring base station that causes interference to the user uses an interference beam to transmit an NZP CSI-RS signal, in the preset interference scenario corresponding to the ZP CSI-RS resource, the neighboring base station that does not cause interference to the user uses an arbitrary beam to transmit a ZP CSI-RS signal. Next, in step S1110, the user measures the configured ZP CSI-RS resources. Next, in step S1111, the user acquires an interference signal power matrix for the preset interference scenario corresponding to the configured ZP CSI-RS resource. As described above, according to steps S1106 to S1111, the user acquires the interference signal power matrix of the preset interference scenario corresponding to the configured ZP CSI-RS resource. According to the embodiment of the present disclosure, steps S1106 to S1111 are repeated, so that the user acquires the interference signal power matrix for each preset interference scenario. As described above, in the process of beam measurement, the user acquires the useful signal power matrix P, and an interference signal power matrix for each preset interference scenario.

Figure 12:
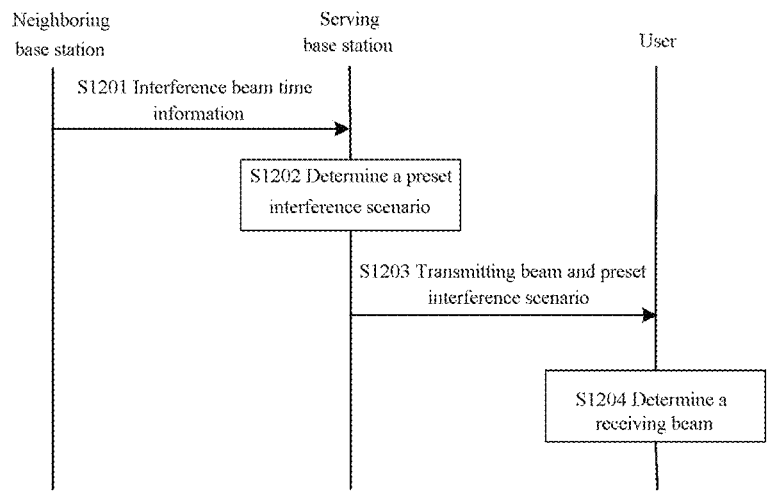
FIG. 12 is a flowchart showing signaling for determining a receiving beam according to an embodiment of the present disclosure.

FIG. 12 is a flowchart showing signaling of determination of a receiving beam according to an embodiment of the present disclosure. In FIG. 12, the serving base station is implemented by the electronic equipment 800, the user is implemented by the electronic equipment 300, and the neighboring base station represents the base station device in the cell adjacent to the electronic equipment 800. As shown in FIG. 12, in step S1201, the serving base station receives interference beam time information from each neighboring base station. Next, in step S1202, the serving base station determines a preset interference scenario according to the received interference beam time information. Next, in step S1203, the serving base station transmits the transmitting beam used by itself and the preset interference scenario to the user. Next, in step S1204, the user determines the receiving beam according to the useful signal power matrix P, each interference signal power matrix $I^k$, the transmitting beam of the serving base station, and the preset interference scenario where the user is located, so that a signal to interference plus noise ratio obtained when the receiving beam is used to receive the downlink information is the largest.

The electronic equipment 800 according to the embodiment of the present disclosure may serve as network side equipment, and the electronic equipment 300 may serve as user equipment. That is, the electronic equipment 800 may provide services for the electronic equipment 300, and therefore all the embodiments of the electronic equipment 300 described in the foregoing are applicable to this.

4. Method Embodiment

Next, a wireless communication method performed by electronic equipment 300 as user side equipment in a wireless communication system is described in detail according to an embodiment of the present disclosure.

Figure 13:
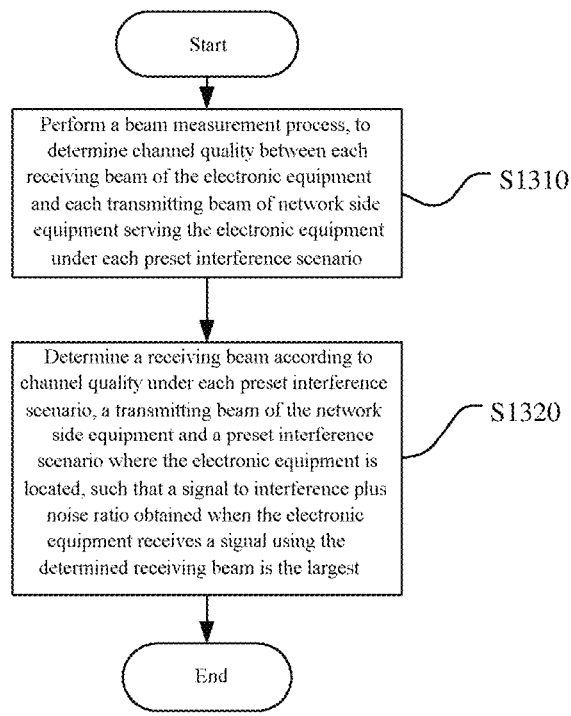
FIG. 13 is a flowchart showing a wireless communication method performed by electronic equipment on a user side according to an embodiment of the present disclosure.

FIG. 13 is a flowchart showing a wireless communication method performed by electronic equipment 300 as user side equipment in a wireless communication system according to an embodiment of the present disclosure.

As shown in FIG. 13, in step S1310, a beam measurement process is performed to determine channel quality between each receiving beam of the electronic equipment 300 and each transmitting beam of the network side equipment serving the electronic equipment 300 in each preset interference scenario.

Next, in step S1320, the receiving beam is determined according to the channel quality in each preset interference scenario, the transmitting beam of the network side equipment, and the preset interference scenario where the electronic equipment 300 is located, so that the signal to interference plus noise ratio obtained when the electronic equipment 300 uses the determined receiving beam to receive signals is the largest.

Here, the preset interference scenario represents the interference conditions of the electronic equipment 300 by the network side equipment around the electronic equipment 300.

Preferably, the beam measurement process includes a measurement process on an NZP CSI-RS resource set and a measurement process on a ZP CSI-RS resource set.

Preferably, the beam measurement process includes: determining a useful signal power matrix according to a measurement result on the NZP CSI-RS resource set, where an element in the useful signal power matrix represents useful signal power obtained when the network side equipment uses a specific transmitting beam to transmit a signal and the electronic equipment 300 uses a specific receiving beam to receive the signal in each preset interference scenario; and determining, according to the measurement result on the ZP CSI-RS resource set, the interference signal power obtained when the electronic equipment 300 receives a signal using each receiving beam in each preset interference scenario.

Preferably, the wireless communication method further includes: determining the useful signal power obtained when the electronic equipment 300 receives a signal using each receiving beam according to the transmitting beam of the network side equipment and the useful signal power matrix; determining the interference signal power obtained when the electronic equipment 300 uses each receiving beam to receive the signal according to a preset interference scenario where the electronic equipment 300 is located; and determining the signal to interference plus noise ratio based on the useful signal power and the interference signal power obtained when the electronic equipment 300 uses each receiving beam to receive a signal.

Preferably, the NZP CSI-RS resource in the NZP CSI-RS resource set corresponds to the transmitting beam of the network side equipment. The wireless communication method further includes: determining correspondence between the NZP CSI-RS resource and the transmitting beam according to configuration information from the network side equipment.

Preferably, the ZP CSI-RS resource in the ZP CSI-RS resource set corresponds to the preset interference scenario. The wireless communication method further includes: determining correspondence between the ZP CSI-RS resource and the preset interference scenario according to configuration information from the network side equipment.

Preferably, the wireless communication method further includes: determining the transmitting beam of the network side equipment according to the TCI state information; and determining the preset interference scenario where the electronic equipment 300 is located according to the DCI.

Preferably, the wireless communication method further includes: determining the transmitting beam of the network side equipment and the preset interference scenario where the electronic equipment 30) is located according to the TC state information.

According to an embodiment of the present disclosure, the above-mentioned method may be performed by the electronic equipment 300 according to the embodiment of the present disclosure, and therefore all the foregoing embodiments regarding the electronic equipment 300 are applicable to this.

Next, a wireless communication method performed by the electronic equipment 800 as a network side equipment in a wireless communication system is described in detail according to an embodiment of the present disclosure.

Figure 14:
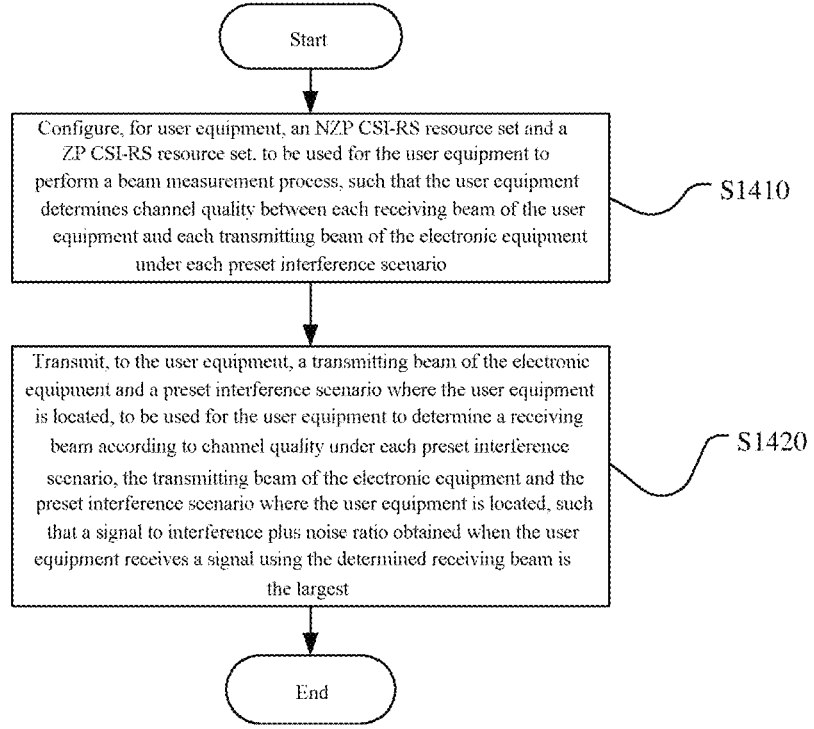
FIG. 14 is a flowchart showing a wireless communication method performed by electronic equipment on a network side according to an embodiment of the present disclosure.

FIG. 14 is a flowchart showing a wireless communication method performed by electronic equipment 800 as a network side equipment in a wireless communication system according to an embodiment of the present disclosure.

As shown in FIG. 14, in step S1410, the NZP CSI-RS resource set and the ZP CSI-RS resource set are configured for the user equipment for performing beam measurement process, so that the user equipment determines the channel quality between each receiving beam of the user equipment and each transmitting beam of the electronic equipment 800 in each preset interference scenario.

Next, in step S1420, the transmitting beam of the electronic equipment 800 and the preset interference scenario where the user equipment is located are sent to the user equipment, so that the user equipment determines the receiving beam according to the channel quality in each preset interference scenario, the transmitting beam of the electronic equipment 800, and the preset interference scenario where the user equipment is located. In this way, the signal to interference plus noise ratio obtained when the user equipment uses the determined receiving beam to receive a signal is the largest.

Here, the preset interference scenario represents interference conditions of other network side equipment adjacent to the electronic equipment 800 to the user equipment.

Preferably, the NZP CSI-RS resource set is configured for the user equipment by: configuring the NZP CSI-RS resource set for the user equipment so that the NZP CSI-RS resource in the NZP CSI-RS resource set corresponds to the transmitting beam of the electronic equipment 800.

Preferably, the ZP CSI-RS resource set is configured for the user equipment by: configuring the ZP CSI-RS resource set for the user equipment so that the ZP CSI-RS resource in the ZP CSI-RS resource set corresponds to a preset interference scenario.

Preferably, the wireless communication method further includes: transmitting reference signal coordination signaling for a specific preset interference scenario to each other network-side equipment adjacent to the electronic equipment 800. The reference signal coordination signaling includes the time-frequency position of the ZP CSI-RS resource corresponding to a specific preset interference scenario, the reference signal type sent by other network side equipment at the time frequency position of the ZP CSI-RS resource, and a transmitting beam when other network side equipment transmits a reference signal on the time-frequency position of the ZP CSI-RS resource.

Preferably, the reference signal type includes NZP CSI-RS and ZP CSI-RS. In a case that other network side equipment causes interference to the user equipment in the preset interference scenario, the reference signal type is NZP CSI-RS, and the transmitting beam is a beam that causes interference to the user equipment. In a case that other network side equipment does not cause interference to the user equipment in the preset interference scenario, the reference signal type is ZP CSI-RS, and the transmitting beam is an arbitrary beam.

Preferably, the wireless communication method further includes: transmitting an NZP CSI-RS at the time-frequency position of the NZP CSI-RS resource configured for the user equipment so that the user equipment determines a useful signal power matrix. Each element in the useful signal power matrix represents useful signal power obtained when the electronic equipment 800 uses a specific transmitting beam to transmit a signal and the user equipment uses a specific receiving beam to receive the signal in each preset interference scenario.

Preferably, the wireless communication method further includes: determining a transmitting beam of the electronic equipment 800 according to all or part of the elements in the useful signal power matrix received from the user equipment.

Preferably, the wireless communication method further includes: transmitting a ZP CSI-RS at the time-frequency position of the ZP CSI-RS resource configured for the user equipment, so that the user equipment determines the interference signal power obtained when using each receiving beam to receive the signal in the preset interference scenario corresponding to the ZP CSI-RS resource.

Preferably, the wireless communication method further includes: receiving interference beam time information from each other network side equipment adjacent to the electronic equipment 800, where the interference beam time information includes the interference beam information used by other network side equipment adjacent to the electronic equipment 800 in multiple time periods; and determining the preset interference scenario where the user equipment is located according to the interference beam time information of each other network-side equipment adjacent to the electronic equipment 800.

Preferably, the wireless communication method further includes: carrying the preset interference scenario where the user equipment is located through DCI, and carrying the transmitting beam of the electronic equipment 800 through TCI state information.

Preferably, the wireless communication method further includes: establishing a correspondence between the TCI state information, the preset interference scenario where the user equipment is located, and the transmitting beam of the electronic equipment 800; and carrying the transmitting beam of the electronic equipment 800 and the preset interference scenario where the user equipment is located through the TCI state information.

According to an embodiment of the present disclosure, the above-mentioned method may be performed the electronic equipment 800 according to the embodiment of the present disclosure. Therefore, all the foregoing embodiments regarding the electronic equipment 800 are applicable to this.

5. Application Example

The technology of the present disclosure is applicable to various products.

The network side equipment may be implemented as any type of TRP. The TRP may have transmitting and receiving functions, for example, the TRP receives information from user equipment and base station equipment, and also transmits information to user equipment and the base station equipment. In a typical example, TRP provides services to user equipment and is controlled by base station equipment. Further, the TRP may have a structure similar to that of the base station device described below, or may only have a structure related to the transmission and reception of information in the base station device.

The network side equipment may be implemented as any type of base station equipment, such as a macro eNB and a small eNB, and may be implemented as any type of gNB (base station in a 5G system). A small eNB may be an eNB that covers a cell smaller than a macro cell, such as a pico eNB, a micro eNB, and a home (femto) eNB. Instead, the base station may be implemented as any other type of base station, such as a NodeB and a base transceiver station (BTS). The base station may include: a main body (also referred to as a base station device) configured to control wireless communication; and one or more remote wireless heads (RRH) set in a place different from the main body.

The user equipment may be implemented as a mobile terminal (such as a smart phone, a tablet personal computer (PC), a notebook PC, a portable game terminal, a portable/dongle type mobile router, and a digital camera) or a vehicle-mounted terminal (such as a car navigation device). The user equipment may also be implemented as a terminal (also referred to as a machine type communication (MTC) terminal) that performs machine-to-machine (M2M) communication. In addition, the user equipment may be a wireless communication module (such as an integrated circuitry module including a single chip) installed on each of the above-mentioned user equipment.

APPLICATION EXAMPLES OF BASE STATION

First Application Example

Figure 15:
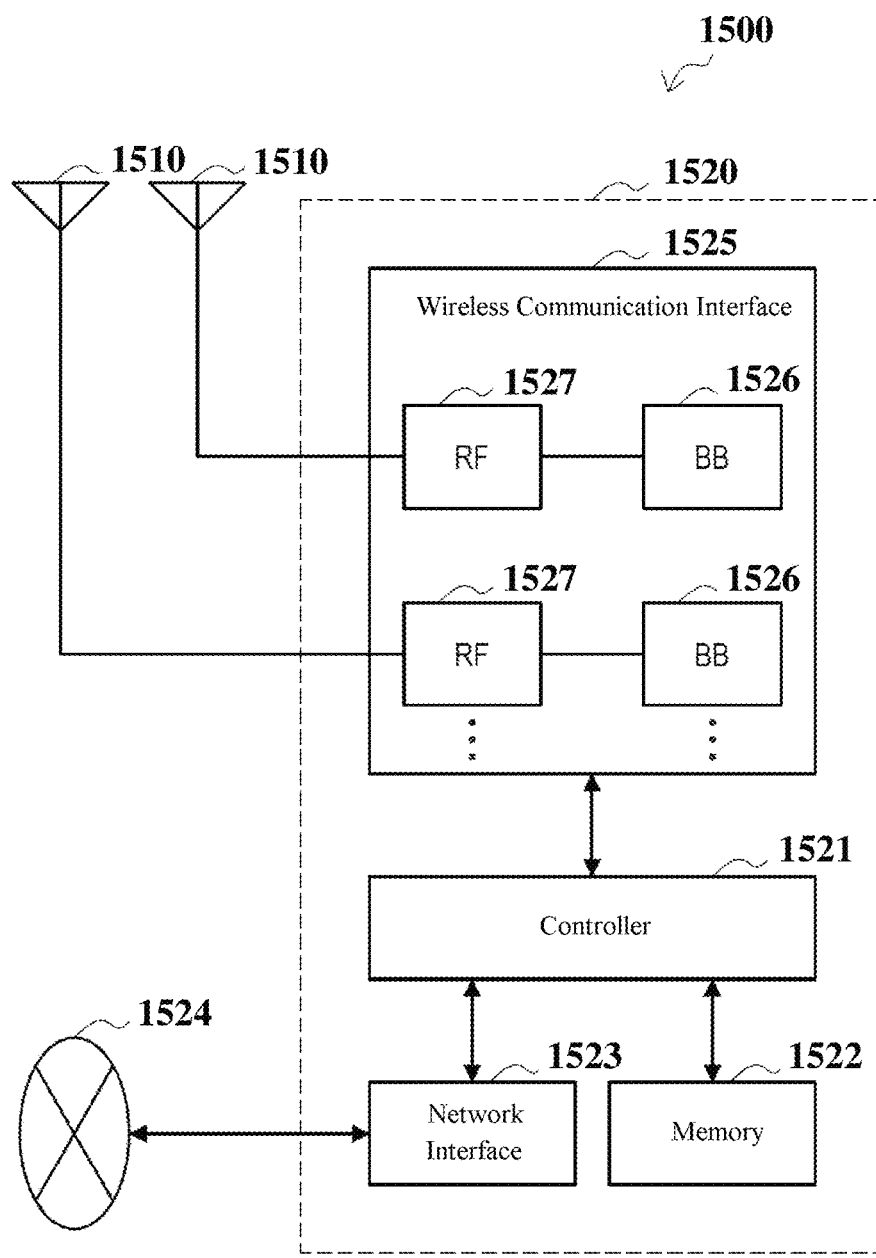
FIG. 15 is a block diagram showing a first example of a schematic configuration of an eNB (Evolved Node B)

FIG. 15 is a block diagram showing a first example of a schematic configuration of an eNB to which the technology of the present disclosure may be applied. The eNB 1500 includes one or more antennas 1510 and a base station device 1520. Each antenna 1510 may be connected to the base station device 1520 via an RF cable.

Each of the antennas 1510 includes a single or multiple antenna elements (such as multiple antenna elements included in a multiple input multiple output (MIMO) antenna), and is used for the base station device 1520 to transmit and receive wireless signals. As shown in FIG. 15, the eNB 1500 may include multiple antennas 1510. For example, the multiple antennas 1510 may be compatible with multiple frequency bands used by the eNB 1500. Although FIG. 15 shows an example where the eNB 1500 includes multiple antennas 1510, the eNB 1500 may also include a single antenna 1510.

The base station device 1520 includes a controller 1521, a memory 1522, a network interface 1523, and a wireless communication interface 1525.

The controller 1521 may be, for example, a CPU or a DSP, and operates various functions of higher layers of the base station device 1520. For example, the controller 1521 generates a data packet based on the data in the signal processed by the wireless communication interface 1525, and transmits the generated packet via the network interface 1523. The controller 1521 may bundle data from multiple baseband processors to generate a bundled packet, and transfer the generated bundled packet. The controller 1521 may have a logic function to perform control such as radio resource control, radio bearer control, mobility management, admission control, and scheduling. This control may be performed in conjunction with nearby eNBs or core network nodes. The memory 1522 includes a RAM and ROM, and stores programs executed by the controller 1521 and various types of control data (such as a terminal list, transmission power data, and scheduling data).

The network interface 1523 is a communication interface for connecting the base station device 1520 to the core network 1524. The controller 1521 may communicate with a core network node or another eNB via a network interface 1523. In this case, the eNB 1500 may be connected to the core network node or another eNB through a logical interface (such as an S1 interface and an X2 interface). The network interface 1523 may also be a wired communication interface or a wireless communication interface for a wireless backhaul line. If the network interface 1523 is a wireless communication interface, the network interface 1823 may use a higher frequency band for wireless communication than the frequency band used by the wireless communication interface 1525.

The wireless communication interface 1525 supports any cellular communication scheme such as Long Term Evolution (LTE) and LTE-Advanced, and provides wireless connection to terminals located in the cell of the eNB 1500 via the antenna 1510. The wireless communication interface 1525 may generally include, for example, a baseband (BB) processor 1526 and RF circuitry 1527. The BB processor 1526 may perform, for example, encoding/decoding, modulation/demodulation, and multiplexing/demultiplexing, and perform various types of signal processing of layers such as Li, Medium Access Control (MAC), Radio Link Control (RLC), and Packet Data Convergence Protocol (PDCP). Instead of the controller 1521, the BB processor 1526 may have a part or all of the above-mentioned logical functions. The BB processor 1526 may be a memory storing a communication control program, or a module including a processor and related circuitry configured to execute the program. The function of the BB processor 1526 may be changed by updating program. The module may be a card or a blade inserted into a slot of the base station device 1520. Alternatively, the module is a chip mounted on a card or blade. Further, the RF circuitry 1527 may include, for example, a mixer, a filter, and an amplifier, and transmit and receive wireless signals via the antenna 1510.

As shown in FIG. 15, the wireless communication interface 1525 may include multiple BB processors 1526. For example, the multiple BB processors 1526 may be compatible with multiple frequency bands used by eNB-1500. As shown in FIG. 15, the wireless communication interface 1525 may include multiple RF circuitry 1527. For example, the multiple RF circuitry 1527 may be compatible with multiple antenna elements. Although FIG. 15 shows an example where the wireless communication interface 1525 includes multiple BB processors 1526 and multiple RF circuitry 1527, the wireless communication interface 1525 may also include a single BB 1526 or a single RF circuitry 1527.

Second Application Example

Figure 16:
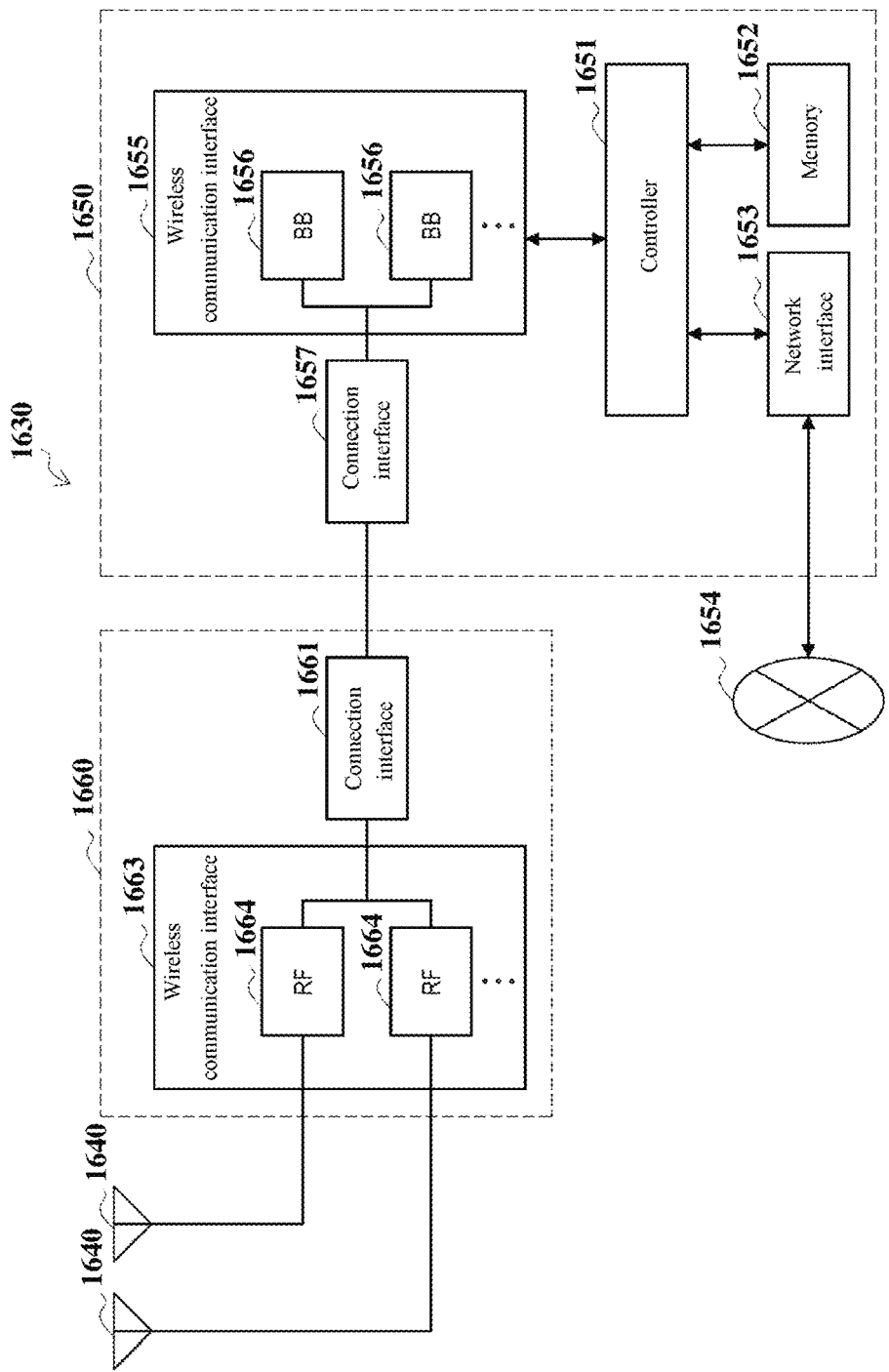
FIG. 16 is a block diagram showing a second example of the schematic configuration of the eNB.

FIG. 16 is a block diagram showing a second example of a schematic configuration of an eNB to which the technology of the present disclosure may be applied. The eNB 1630 includes one or more antennas 1640, a base station device 1650, and an RRH 1660. Each antenna 1640 may be connected to the RRH 1660 via an RF cable. The base station device 1650 may be connected to the RRH 1660 via a high-speed line such as an optical fiber cable.

Each of the antennas 1640 includes a single or multiple antenna elements (such as multiple antenna elements included in a MIMO antenna) and is used for the RRH 1660 to transmit and receive wireless signals. As shown in FIG. 16, the eNB 1630 may include multiple antennas 1640. For example, the multiple antennas 1640 may be compatible with multiple frequency bands used by the eNB 1930. Although FIG. 16 shows an example where the eNB 1630 includes multiple antennas 1640, the eNB 1630 may also include a single antenna 1640.

The base station device 1650 includes a controller 1651, a memory 1652, a network interface 1653, a wireless communication interface 1655, and a connection interface 1657. The controller 1651, the memory 1652, and the network interface 1653 are the same as the controller 1521, the memory 1522, and the network interface 1523 described with reference to FIG. 15.

The wireless communication interface 1655 supports any cellular communication scheme such as LTE and LTE-Advanced, and provides wireless communication to terminals located in a sector corresponding to the RRH 1660 via the RRH 1660 and the antenna 1640. The wireless communication interface 1655 may generally include, for example, a BB processor 1656. The BB processor 1656 is the same as the BB processor 1526 described with reference to FIG. 15 except that the BB processor 1656 is connected to the RF circuitry 1664 of the RRH 1660 via the connection interface 1657. As shown in FIG. 16, the wireless communication interface 1655 may include multiple BB processors 1656. For example, the multiple BB processors 1656 may be compatible with multiple frequency bands used by the eNB 1630. Although FIG. 16 shows an example where the wireless communication interface 1655 includes multiple BB processors 1656, the wireless communication interface 1655 may also include a single BB processor 1656.

The connection interface 1657 is an interface for connecting the base station device 1650 (wireless communication interface 1655) to the RRH 1660. The connection interface 1657 may also be a communication module used to connect the base station device 1650 (wireless communication interface 1655) to the communication in the above-mentioned high-speed line of the RRH 1660.

The RRH 1660 includes a connection interface 1661 and a wireless communication interface 1663.

The connection interface 1661 is an interface for connecting the RRH 1660 (wireless communication interface 1663) to the base station device 1650. The connection interface 1661 may also be a communication module used for communication in the above-mentioned high-speed line.

The wireless communication interface 1663 transmits and receives wireless signals via the antenna 1640. The wireless communication interface 1663 may generally include, for example, RF circuitry 1664. The RF circuitry 1664 may include, for example, a mixer, a filter, and an amplifier, and transmit and receive wireless signals via the antenna 1640. As shown in FIG. 16, the wireless communication interface 1663 may include multiple RF circuitry 1664. For example, the multiple RF circuitry 1664 may support multiple antenna elements. Although FIG. 16 shows an example where the wireless communication interface 1663 includes multiple RF circuitry 1664, the wireless communication interface 1663 may also include single RF circuitry 1664.

In the eNB 1500 shown in FIG. 15 and the eNB 1630 shown in FIG. 16, the configuration unit 810, the transmission beam determination unit 820, the scenario determination unit 830, the storage unit 850, and the generation unit 860 described in FIG. 8 may be implemented by the controller 1521 and/or the controller 1651. At least part of the functions may also be implemented by the controller 1521 and the controller 1651. For example, the controller 1521 and/or the controller 1651 may execute instructions stored in a corresponding memory, to configure ZP CSI-RS resources and NZP CSI-RS resources for the user equipment, determine the transmitting beam, determine the preset interference scenario where the user equipment is located, store the correspondence between ZP CSI-RS resources and preset interference scenarios and the correspondence between NZP CSI-RS resources and the transmitting beam, and generate reference signal coordination signaling.

APPLICATION EXAMPLES FOR TERMINAL EQUIPMENT

First Application Example

Figure 17:
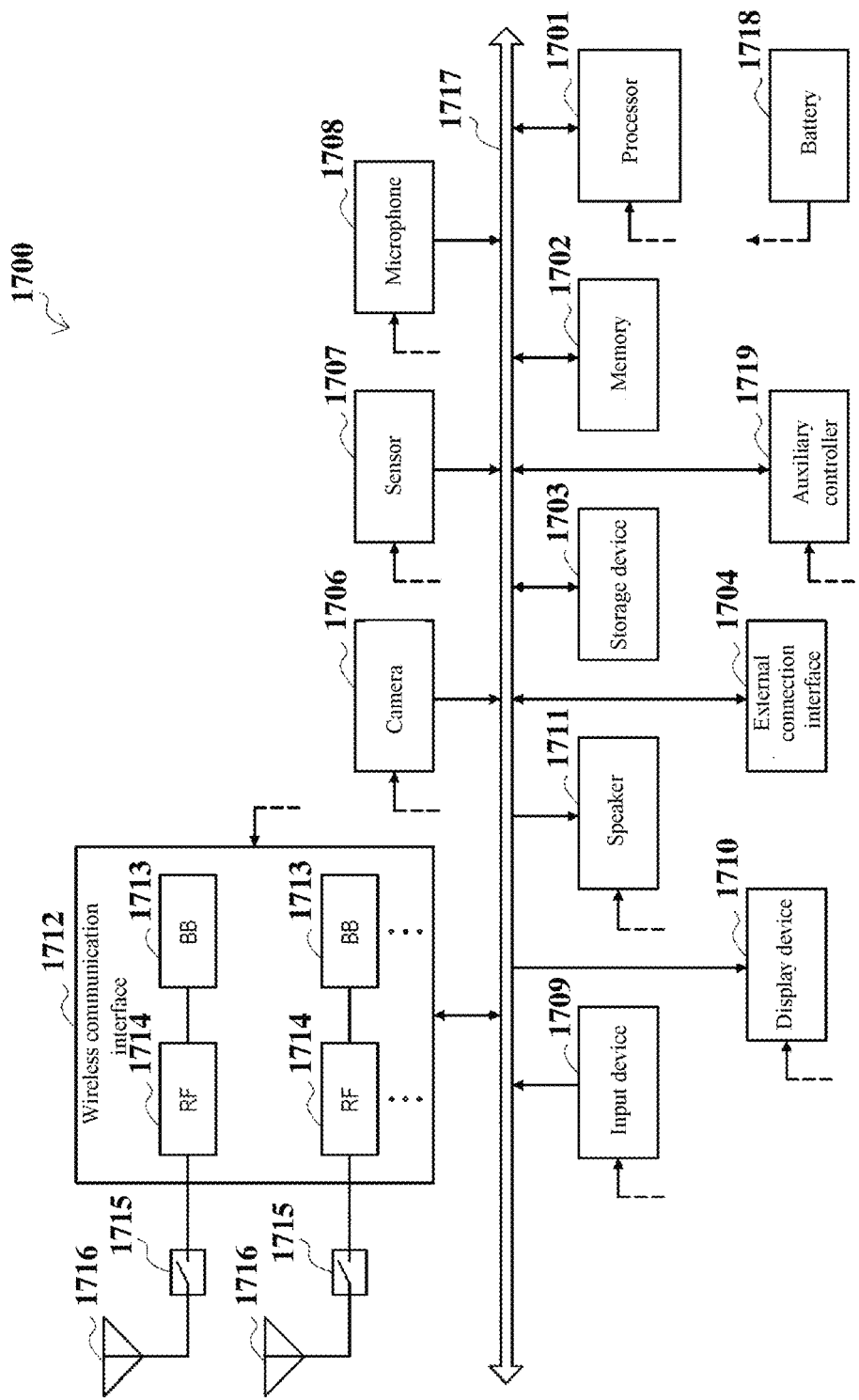
FIG. 17 is a block diagram showing an example of a schematic configuration of a smartphone.

FIG. 17 is a block diagram showing an example of a schematic configuration of a smartphone 1700 to which the technology of the present disclosure may be applied. The smartphone 1700 includes a processor 1701, a memory 1702, a storage device 1703, an external connection interface 1704, a camera 1706, a sensor 1707, a microphone 1708, an input device 1709, a display device 1710, a speaker 1711, a wireless communication interface 1712, one or more antenna switches 1715, one or more antennas 1716, a bus 1717, a battery 1718, and an auxiliary controller 1719.

The processor 1701 may be, for example, a CPU or a system on a chip (SoC), and controls functions of the application layer and other layers of the smartphone 1700. The memory 1702 includes a RAM and a ROM, and stores data and programs executed by the processor 1701. The storage device 1703 may include a storage medium, such as a semiconductor memory and a hard disk. The external connection interface 1704 is an interface for connecting external devices (such as memory cards and universal serial bus (USB) devices) to the smartphone 1700.

The camera 1706 includes an image sensor such as (a charge coupled device (CCD) and a complementary metal oxide semiconductor (CMOS)), and generates a captured image. The sensor 1707 may include a group of sensors, such as a measurement sensor, a gyroscope sensor, a geomagnetic sensor, and an acceleration sensor. The microphone 1708 converts sound inputted to the smartphone 1700 into an audio signal. The input device 1709 includes, for example, a touch sensor, a keypad, a keyboard, a button, or a switch configured to detect a touch on the screen of the display device 1710, and receives operations or information input from the user. The display device 1710 includes a screen (such as a liquid crystal display (LCD) and an organic light emitting diode (OLED) display), and displays an output image of the smartphone 1700. The speaker 1711 converts an audio signal outputted from the smartphone 1700 into sound.

The wireless communication interface 1712 supports any cellular communication scheme (such as LTE and LTE-Advanced), and performs wireless communication. The wireless communication interface 1712 may generally include, for example, a BB processor 1713 and RF circuitry 1714. The BB processor 1713 may perform, for example, encoding/decoding, modulation/demodulation, and multiplexing/demultiplexing, and performs various types of signal processing for wireless communication. Further, the RF circuitry 1714 may include, for example, a mixer, a filter, and an amplifier, and transmit and receive wireless signals via an antenna 1716. The wireless communication interface 1712 may be a chip module on which the BB processor 1713 and the RF circuitry 1714 are integrated. As shown in FIG. 17, the wireless communication interface 1712 may include multiple BB processors 1713 and multiple RF circuitry 1714. Although FIG. 17 shows an example where the wireless communication interface 1712 includes multiple BB processors 1713 and multiple RF circuitry 1714, the wireless communication interface 1712 may also include a single BB processor 1713 or a single RF circuitry 1714.

In addition to the cellular communication scheme, the wireless communication interface 1712 may support another type of wireless communication scheme, such as a short-range wireless communication scheme, a near field communication scheme, and a wireless local area network (LAN) scheme. In this case, the wireless communication interface 1712 may include a BB processor 1713 and an RF circuitry 1714 for each wireless communication scheme.

Each of the antenna switches 1715 switches the connection destination of the antenna 1716 among multiple circuitry (for example, circuitry for different wireless communication schemes) included in the wireless communication interface 1712.

Each of the antennas 1716 includes a single or multiple antenna elements (such as multiple antenna elements included in a MIMO antenna), and is used for the wireless communication interface 1712 to transmit and receive wireless signals. As shown in FIG. 17, the smartphone 1700 may include multiple antennas 1716. Although FIG. 17 shows an example where the smartphone 1700 includes multiple antennas 1716, the smartphone 1700 may also include a single antenna 1716.

In addition, the smartphone 1700 may include an antenna 1716 for each wireless communication scheme. In this case, the antenna switch 1715 may be omitted from the configuration of the smartphone 1700.

The processor 1701, the memory 1702, the storage device 1703, the external connection interface 1704, the camera 1706, the sensor 1707, the microphone 1708, the input device 1709, the display device 1710, the speaker 1711, the wireless communication interface 1712, and the auxiliary controller 1719 are connected to each other via the bus 1717. The battery 1718 supplies power to various blocks of the smartphone 1700 shown in FIG. 17 via a feeder line, which is partially shown as a dashed line in the drawings. The auxiliary controller 1719 operates the minimum necessary functions of the smartphone 1700 in a sleep mode, for example.

In the smartphone 1700 shown in FIG. 17, the measurement unit 310, the receiving beam determination unit 320, the storage unit 340, the transmitting beam determination unit 350, and the scenario determination unit 360 shown in FIG. 3 may be implemented by the processor 1701 or the auxiliary controller 1719. At least part of the functions may also be implemented by the processor 1701 or the auxiliary controller 1719. For example, the processor 1701 or the auxiliary controller 1719 may execute instructions stored in the memory 1702 or the storage device 1703 to perform beam measurement, determine the receiving beam, store the correspondence between the ZP CSI-RS resource and the preset interference scenario and the correspondence between the NZP CSI-RS resource and the transmitting beam, determine the transmitting beam of the network side equipment and determine the preset interference scenario.

Second Application Example

Figure 18:
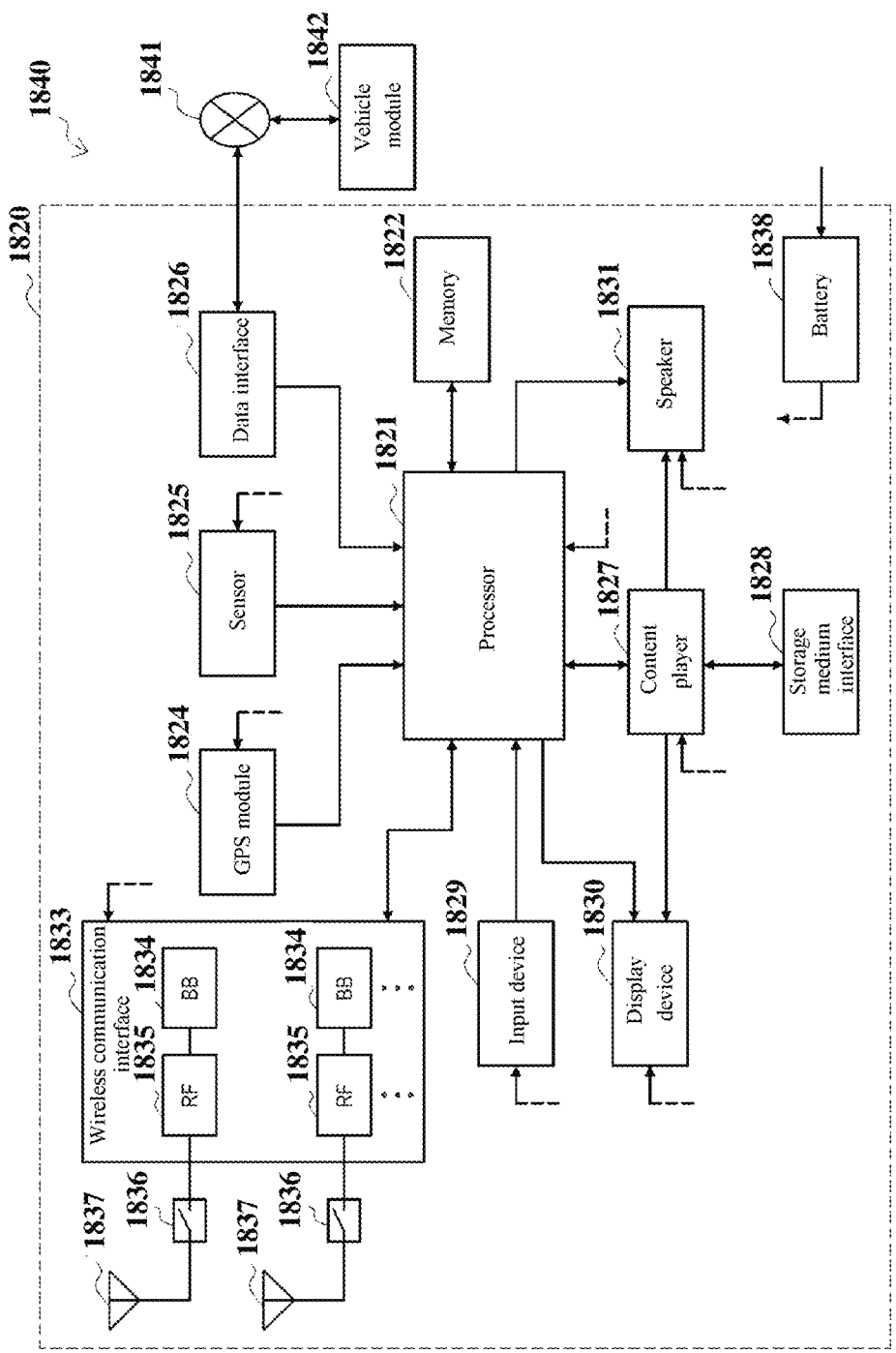
FIG. 18 is a block diagram showing an example of a schematic configuration of a vehicle navigation equipment.

FIG. 18 is a block diagram showing an example of a schematic configuration of a car navigation device 1820 to which the technology of the present disclosure may be applied.

The car navigation device 1820 includes a processor 1821, a memory 1822, a global positioning system (GPS) module 1824, a sensor 1825, a data interface 1826, a content player 1827, a storage medium interface 1828, an input device 1829, a display device 1830, a speaker 1831, a wireless communication interface 1833, one or more antenna switches 1836, one or more antennas 1837, and a battery 1838.

The processor 1821 may be, for example, a CPU or SoC, and controls navigation function and other functions of the car navigation device 1820. The memory 1822 includes a RAM and a ROM, and stores data and programs executed by the processor 1821.

The GPS module 1824 uses GPS signals received from GPS satellites to measure a position (such as latitude, longitude, and altitude) of the car navigation device 1820. The sensor 1825 may include a group of sensors, such as a gyroscope sensor, a geomagnetic sensor, and an air pressure sensor. The data interface 1826 is connected to, for example, a vehicle-mounted network 1841 via a terminal not shown, and acquires data (such as vehicle speed data) generated by the vehicle.

The content player 1827 reproduces content stored in a storage medium such as a CD and a DVD, which is inserted into the storage medium interface 1828. The input device 1829 includes, for example, a touch sensor, a button, or a switch configured to detect a touch on the screen of the display device 1830, and receives an operation or information inputted from the user. The display device 1830 includes a screen such as an LCD or OLED display, and displays an image of a navigation function or reproduced content. The speaker 1831 outputs the sound of the navigation function or the reproduced content.

The wireless communication interface 1833 supports any cellular communication scheme (such as LTE and LTE-Advanced), and performs wireless communication. The wireless communication interface 1833 may generally include, for example, a BB processor 1834 and an RF circuitry 1835. The BB processor 1834 may perform, for example, encoding/decoding, modulation/demodulation, and multiplexing/demultiplexing, and perform various types of signal processing for wireless communication. Further, the RF circuitry 1835 may include, for example, a mixer, a filter, and an amplifier, and transmit and receive wireless signals via an antenna 1837. The wireless communication interface 1833 may also be a chip module on which the BB processor 1834 and the RF circuitry 1835 are integrated. As shown in FIG. 18, the wireless communication interface 1833 may include multiple BB processors 1834 and multiple RF circuitry 1835. Although FIG. 18 shows an example where the wireless communication interface 1833 includes multiple BB processors 1834 and multiple RF circuitry 1835, the wireless communication interface 1833 may also include a single BB processor 1834 or single RF circuitry 1835.

In addition to the cellular communication scheme, the wireless communication interface 1833 may support another type of wireless communication scheme, such as a short-range wireless communication scheme, a near field communication scheme, and a wireless LAN scheme. In this case, the wireless communication interface 1833 may include a BB processor 1834 and an RF circuitry 1835 for each wireless communication scheme.

Each of the antenna switches 1836 switches the connection destination of the antenna 1837 among multiple circuitry (such as circuitry for different wireless communication schemes) included in the wireless communication interface 1833.

Each of the antennas 1837 includes a single or multiple antenna elements (such as multiple antenna elements included in a MIMO antenna), and is used for the wireless communication interface 1833 to transmit and receive wireless signals. As shown in FIG. 18, the car navigation device 1820 may include multiple antennas 1837. Although FIG. 18 shows an example where the car navigation device 1820 includes multiple antennas 1837, the car navigation device 1820 may also include a single antenna 1837.

In addition, the car navigation device 1820 may include an antenna 1837 for each wireless communication scheme. In this case, the antenna switch 1836 may be omitted from the configuration of the car navigation device 1820.

The battery 1838 supplies power to each block of the car navigation device 1820 shown in FIG. 18 via a feeder line, which is partially shown as a dashed line in the drawings. The battery 1838 accumulates electric power supplied from the vehicle.

In the car navigation device 1820 shown in FIG. 18, the measurement unit 310, the receiving beam determination unit 320, the storage unit 340, the transmitting beam determination unit 350, and the scenario determination unit 360 shown in FIG. 3 may be implemented by the processor 1821. At least part of the functions may be implemented by the processor 1821. For example, the processor 1821 may execute instructions stored in the memory 1822 to perform the beam measurement, determine the receiving beam, store the correspondence between the ZP CSI-RS resource and the preset interference scenario, the correspondence between the NZP CSI-RS resource and the transmitting beam, determine the transmitting beam of the network side equipment, and determine the preset interference scenario.

The technology of the present disclosure may also be implemented as a vehicle-mounted system (or vehicle) 1840 including one or more blocks in a car navigation device 1820, a vehicle-mounted network 1841, and a vehicle module 1842. The vehicle module 1842 generates vehicle data (such as vehicle speed, engine speed, and failure information), and outputs the generated data to the vehicle-mounted network 1841.

Preferred embodiments of the present disclosure have been described above with reference to the accompanying drawings. However, the present disclosure is not limited to the above examples. Those skilled in the art may get various changes and modifications within the scope of the appended claims, and it should be understood that these changes and modifications will naturally fall within the technical scope of the present disclosure.

For example, the units shown in dashed boxes in the functional block diagram shown in the accompanying drawings all indicate that the functional unit is optional in the corresponding device, and optional functional units can be combined in an appropriate manner to achieve a required function.

For example, multiple functions included in one unit in the above embodiments may be implemented by separate devices. Alternatively, multiple functions respectively implemented by multiple units in the above embodiments may be implemented by separate devices. In addition, one of the above functions may be implemented by multiple units. Needless to say, such a configuration is included in the technical scope of the present disclosure.

In this specification, steps described in the flowchart include not only processing performed in time series in the described order, but also processing performed in parallel or separately instead of necessarily in time series. In addition, even in the steps processed in time series, needless to say, the order can be changed appropriately.

Although the embodiments of the present disclosure have been described in detail above with reference to the accompanying drawings, it should be understood that the above-described embodiments are only used to illustrate the present disclosure, and do not constitute a limitation to the present disclosure. For those skilled in the art, various modifications and changes can be made to the above-mentioned embodiments without departing from the essence and scope of the present disclosure. Therefore, the scope of the present disclosure is limited only by the appended claims and their equivalent meanings.

The invention claimed is:

1. An electronic equipment serving as a network side equipment serving a user equipment, comprising processing circuitry configured to:
    configure, for the user equipment, a non-zero-power channel state information-reference signal (NZP CSI-RS) resource set and a zero-power channel state information-reference signal (ZP CSI-RS) resource set, to be used by the user equipment to perform a beam measurement process, such that the user equipment determines channel quality between each receiving beam of the user equipment and each transmitting beam of the electronic equipment under each of a plurality of preset interference scenarios; and
    transmit, to the user equipment, a transmitting beam of the electronic equipment and a preset interference scenario of the plurality of preset interference scenarios corresponding to where the user equipment is located, to be used by the user equipment to determine a receiving beam according to channel quality under each of the plurality of preset interference scenarios,
    wherein the transmitting beam of the electronic equipment and the preset interference scenario of the plurality of preset interference scenarios corresponds to where the user equipment is located, such that a signal to interference plus noise ratio obtained when the user equipment receives a signal using the determined receiving beam is the largest,
    wherein each of the plurality of preset interference scenarios represents interference conditions of one or more other network side equipment adjacent to the electronic equipment and also serving to the user equipment,
    wherein the processing circuitry is further configured to transmit reference signal coordination signaling for a specific preset interference scenario of the plurality of preset interference scenarios to each of the one or more other network side equipment serving the electronic equipment, and
    wherein the reference signal coordination signaling comprises:
        a time-frequency position of a ZP CSI-RS resource of the ZP CSI-RS resource set corresponding to the specific preset interference scenario of the plurality of preset interference scenarios, a reference signal type sent by the one or more other network side equipment at the time-frequency position of the ZP CSI-RS resource, and a transmitting beam when the one or more other network side equipment transmits a reference signal on the time-frequency position of the ZP CSI-RS resource.

2. The electronic equipment according to claim 1, wherein the processing circuitry is further configured to:

configure the NZP CSI-RS resource set for the user equipment, such that NZP CSI-RS resources in the NZP CSI-RS resource set have a correspondence relationship with transmitting beams of the electronic equipment.

3. The electronic equipment according to claim 1, wherein the processing circuitry is further configured to:

configure the ZP CSI-RS resource set for the user equipment so that ZP CSI-RS resources in the ZP CSI-RS resource set have a corresponding relationship with the plurality of preset interference scenarios.

4. The electronic equipment according to claim 1, wherein the reference signal type comprises one of a NZP CSI-RS or a ZP CSI-RS, wherein in a case that the one or more other network side equipment causes interference to the user equipment in the specific preset interference scenario, the reference signal type is the NZP CST-RS, and the transmitting beam is a beam that causes interference to the user equipment; and in a case that the one or more other network side equipment does not cause interference to the user equipment in the specific preset interference scenario, the reference signal type is the ZP CSI-RS, and the transmitting beam is an arbitrary beam.

5. The electronic equipment according to claim 4, wherein the processing circuitry is further configured to:

transmit the NZP CSI-RS at the time-frequency position of the NZP CSI-RS resource of the NZP CSI-RS resource set configured for the user equipment, for the user equipment to determine a useful signal power matrix, wherein each element in the useful signal power matrix represents useful signal power obtained when the electronic equipment uses a specific transmitting beam to transmit a signal and the user equipment uses a specific receiving beam to receive the signal in each of the plurality of preset interference scenarios.

6. The electronic equipment according to claim 5, wherein the processing circuitry is further configured to determine the transmitting beam of the electronic equipment according to all or part of elements in the useful signal power matrix received from the user equipment.

7. The electronic equipment according to claim 4, wherein the processing circuitry is further configured to transmit the ZP CSI-RS of the ZP CSI-RS set at the time-frequency position of the ZP CSI-RS resource configured for the user equipment, for the user equipment to determine interference signal power obtained when using each receiving beam to receive a signal in the specific preset interference scenario of the plurality of preset interference scenarios corresponding to the ZP CSI-RS resource.

8. The electronic equipment according to claim 1, wherein the processing circuitry is further configured to:

receive interference beam time information from each of the one or more other network side equipment adjacent to the electronic equipment, wherein the interference beam time information comprises interference beam information used by the one or more other network side equipment adjacent to the electronic equipment in a plurality of time periods; and determine the preset interference scenario of the plurality of preset interference scenarios corresponding to where the user equipment is located according to the interference beam time information of each of the one or more other network-side equipment adjacent to the electronic equipment.

9. The electronic equipment according to claim 1, wherein the processing circuitry is further configured to:

embed the preset interference scenario of the plurality of preset interference scenarios corresponding to where the user equipment is located in downlink control information (DCI); and embed the transmitting beam of the electronic equipment in transmitting configuration indication (TCI) state information.

10. The electronic equipment according to claim 1, wherein the processing circuitry is further configured to:

establish a correspondence between transmitting configuration indication (TCI) state information and the preset interference scenario of the plurality of preset interference scenarios corresponding to where the user equipment is located and the transmitting beam of the electronic equipment; and embed the transmitting beam of the electronic equipment and the preset interference scenario of the plurality of preset interference scenarios corresponding to where the user equipment is located in the TCI state information.

11. A wireless communication method performed by electronic equipment serving as a network side equipment serving a user equipment, the method comprising:

configuring, for the user equipment, a non-zero-power channel state information-reference signal (NZP CSI-RS) resource set and a zero-power channel state information-reference signal (ZP CSI-RS) resource set, to be used by the user equipment to perform a beam measurement process, such that the user equipment determines channel quality between each receiving beam of the user equipment and each transmitting beam of the electronic equipment under each of a plurality of preset interference scenarios; and transmitting, to the user equipment, a transmitting beam of the electronic equipment and a preset interference scenario of the plurality of preset interference scenarios corresponding to where the user equipment is located, to be used by the user equipment to determine a receiving beam according to channel quality under each of the plurality of preset interference scenarios, wherein the transmitting beam of the electronic equipment and the preset interference scenario of the plurality of preset interference scenarios correspond to where the user equipment is located, such that a signal to interference plus noise ratio obtained when the user equipment receives a signal using the determined receiving beam is the largest, wherein each of the plurality of preset interference scenarios represents interference conditions of one or more other network side equipment adjacent to the electronic equipment and also serving the user equipment, wherein the method further comprises transmitting reference signal coordination signaling for a specific preset interference scenario of the plurality of preset interference scenarios to each of the one or more other network side equipment serving the electronic equipment, and wherein the reference signal coordination signaling comprises:
- a time-frequency position of a ZP CSI-RS resource of the ZP CSI-RS resource set corresponding to the specific preset interference scenario of the plurality of preset interference scenarios,
- a reference signal type sent by the one or more other network side equipment at the time-frequency position of the ZP CSI-RS resource, and
- a transmitting beam when the one or more other network side equipment transmits a reference signal on the time-frequency position of the ZP CSI-RS resource.

12. A non-transitory computer product containing instructions for a wireless communication method performed by electronic equipment serving as a network side equipment serving a user equipment, the method comprising:
- configuring, for the user equipment, a non-zero-power channel state information-reference signal (NZP CSI-RS) resource set and a zero-power channel state information-reference signal (ZP CSI-RS) resource set, to be used by the user equipment to perform a beam measurement process, such that the user equipment determines channel quality between each receiving beam of the user equipment and each transmitting beam of the electronic equipment under each of a plurality of preset interference scenarios; and
- transmitting, to the user equipment, a transmitting beam of the electronic equipment and a preset interference scenario of the plurality of preset interference scenarios corresponding to where the user equipment is located, to be used by the user equipment to determine a receiving beam according to channel quality under each of the plurality of preset interference scenarios, wherein the transmitting beam of the electronic equipment and the preset interference scenario of the plurality of preset interference scenarios correspond to where the user equipment is located, such that a signal to interference plus noise ratio obtained when the user equipment receives a signal using the determined receiving beam is the largest, wherein each of the plurality of preset interference scenarios represents interference conditions of one or more other network side equipment adjacent to the electronic equipment and also serving the user equipment, wherein the method further comprises transmitting reference signal coordination signaling for a specific preset interference scenario of the plurality of preset interference scenarios to each of the other network side equipment serving the electronic equipment, and wherein the reference signal coordination signaling comprises:
- a time-frequency position of a ZP CSI-RS resource of the ZP CSI-RS resource set corresponding to the specific preset interference scenario of the plurality of preset interference scenarios,
- a reference signal type sent by the other network side equipment at the time-frequency position of the ZP CSI-RS resource, and
- a transmitting beam when the other network side equipment transmits a reference signal on the time-frequency position of the ZP CSI-RS resource.

* * * * *